(12) United States Patent
Tanaka et al.

(10) Patent No.: US 7,246,869 B2
(45) Date of Patent: Jul. 24, 2007

(54) PRINTING WITH VARIED DOT-RECORDING RATE WITH RESPECT TO EACH PRINTING REGION

(75) Inventors: Kentaro Tanaka, Nagano-ken (JP); Yukimitsu Fujimori, Nagano-ken (JP); Toshiaki Kakutani, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 314 days.

(21) Appl. No.: 10/884,196

(22) Filed: Jul. 2, 2004

(65) Prior Publication Data
US 2005/0062778 A1 Mar. 24, 2005

(30) Foreign Application Priority Data

| Jul. 3, 2003 | (JP) | ............................. 2003-191142 |
| Sep. 4, 2003 | (JP) | ............................. 2003-312098 |
| Oct. 1, 2003 | (JP) | ............................. 2003-343232 |

(51) Int. Cl.
*B41J 2/205* (2006.01)

(52) U.S. Cl. .......................................... 347/16; 347/15

(58) Field of Classification Search .................. 347/15, 347/16, 43, 40, 19
See application file for complete search history.

(56) References Cited

U.S. PATENT DOCUMENTS 7,011,383 B2* 3/2006 Edwards et al. ............... 347/16

2003/0202027 A1* 10/2003 Igari ............................ 347/15

FOREIGN PATENT DOCUMENTS

| JP | 2002-103586 | 4/2002 |
| JP | 2002-240253 | 8/2002 |

OTHER PUBLICATIONS

Abstract of Japanese Patent Publication No. 2002-103586, Pub. Date: Apr. 9, 2002, Patent Abstracts of Japan.
Abstract of Japanese Patent Publication No. 2002-240253, Pub. Date: Aug. 28, 2002, Patent Abstracts of Japan.

* cited by examiner

*Primary Examiner*—Lamson Nguyen
(74) *Attorney, Agent, or Firm*—Martine Penilla & Gencarella, LLP

(57) ABSTRACT

The method of the present invention generates print data to be supplied to a printing module, which ejects ink to form dots on a printing medium. This method includes a dot data generation step of generating dot data, which represent a dot formation in respective pixels, according to pixel values of given video data with regard to the respective pixels. The dot data generation step includes the step of generating the dot data, such that a dot formation with respect to at least part of the pixel values in a pixel belonging to an end area located on an end of the printing medium is different from the dot formation in a pixel belonging to a middle area located in a middle of the printing medium, so as to prevent adhesion of ink to the printing module.

22 Claims, 31 Drawing Sheets

Fig.5
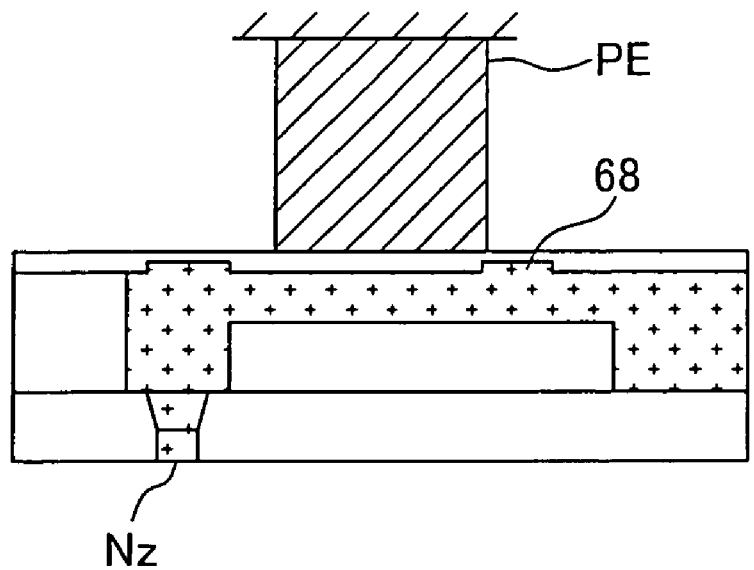
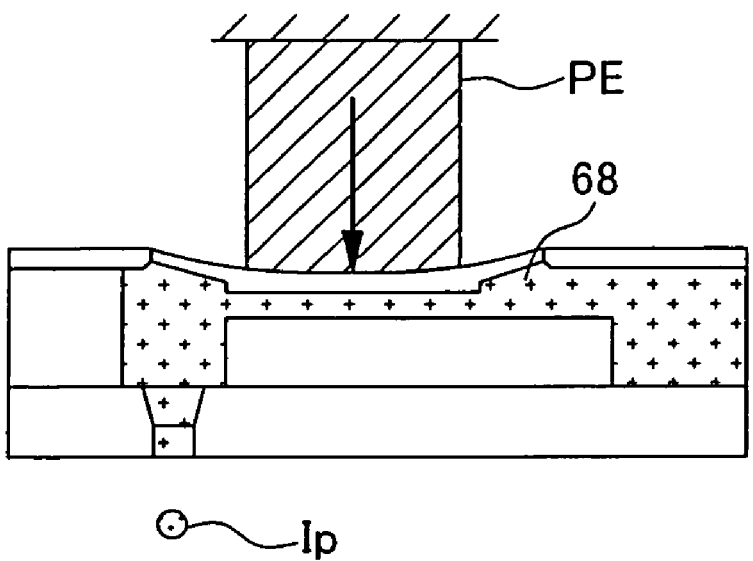

FIRST EMBODIMENT

MIDDLE-AREA DOT
RECORDING RATE
TABLE DTmid

END-AREA DOT
RECORDING RATE
TABLE DTend

MIDDLE-AREA DOT RECORDING RATE TABLE

END-AREA DOT RECORDING RATE TABLE

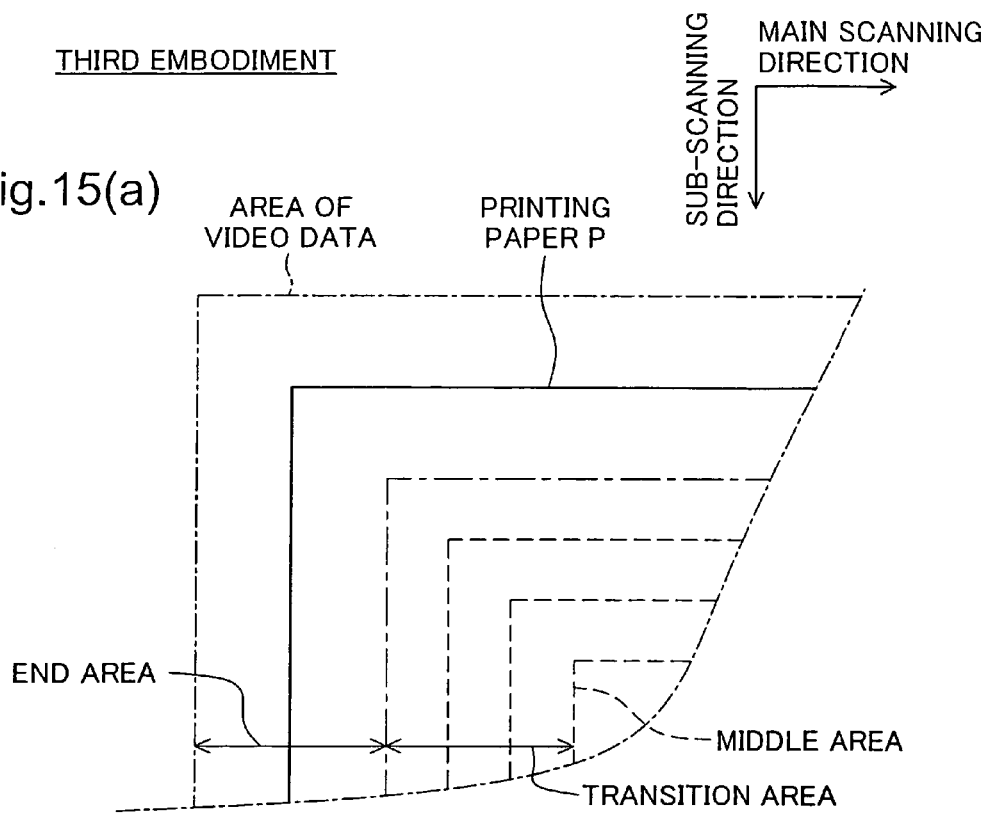
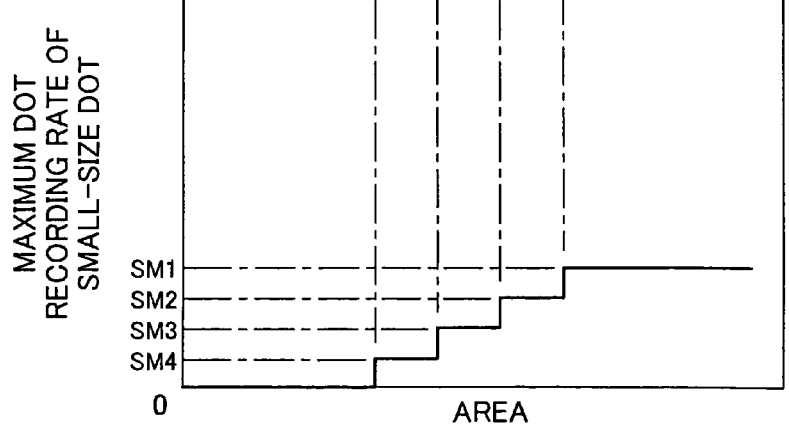

FOURTH EMBODIMENT

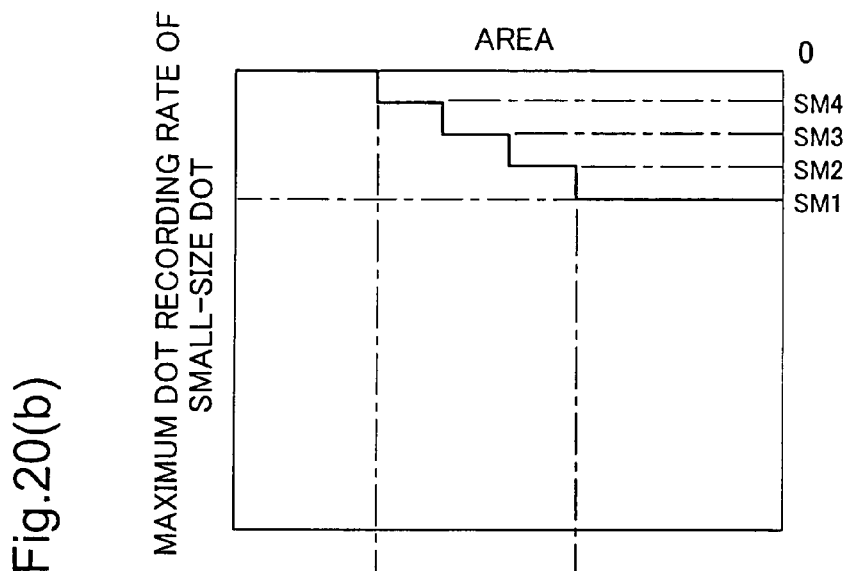
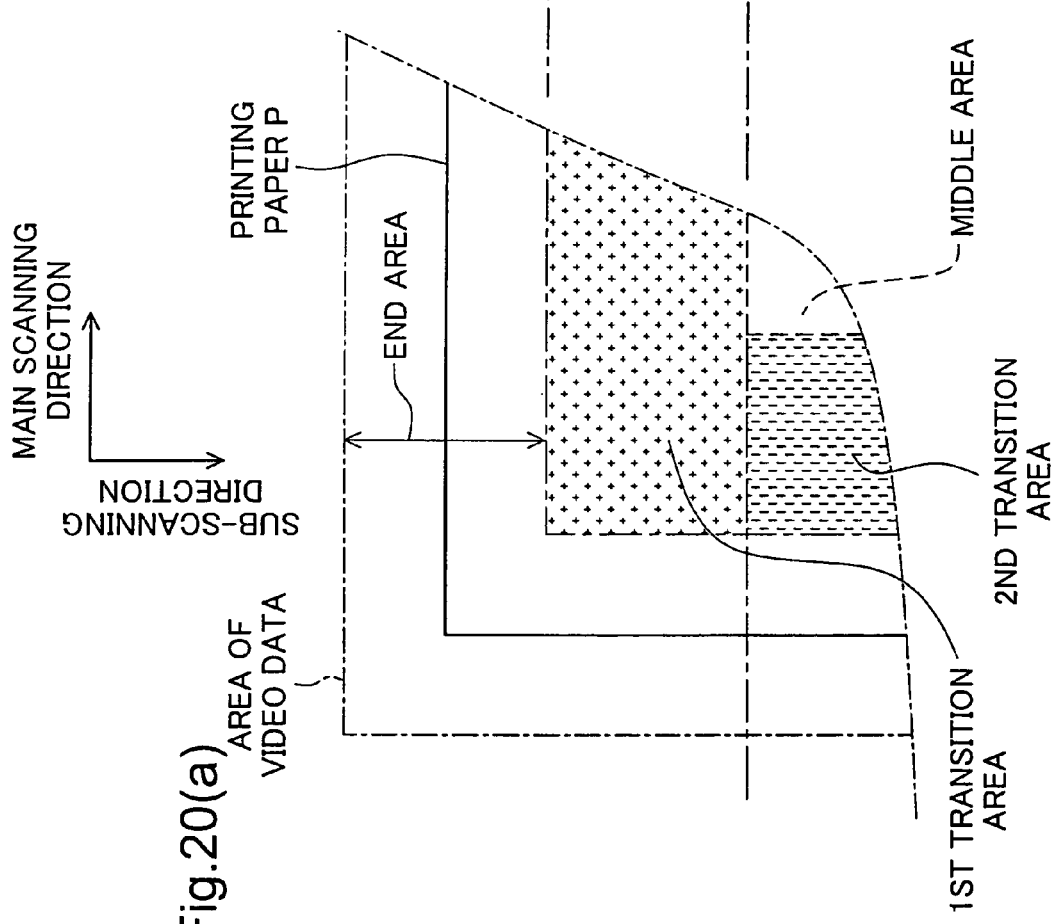

SIXTH EMBODIMENT

INK TONE VALUE AT W HUE AXIS

MIDDLE-AREA COLOR CONVERSION TABLE

END-AREA COLOR CONVERSION TABLE

Fig.30

| Size of Printing Paper | Type of Printing Paper | Marginal Widths in Main Scanning Direction | | Marginal Widths in Sub-Scanning Direction | |
|---|---|---|---|---|---|
| | | M1 | M2 | S1 | S2 |
| A4 | Plain | 2.5mm | 2.5mm | 3mm | 5mm |
| | Special | 2.5mm | 2.5mm | 3mm | 4mm |
| B5 | Plain | 2mm | 2mm | 2mm | 4mm |
| | Special | 2mm | 2mm | 2mm | 3mm |

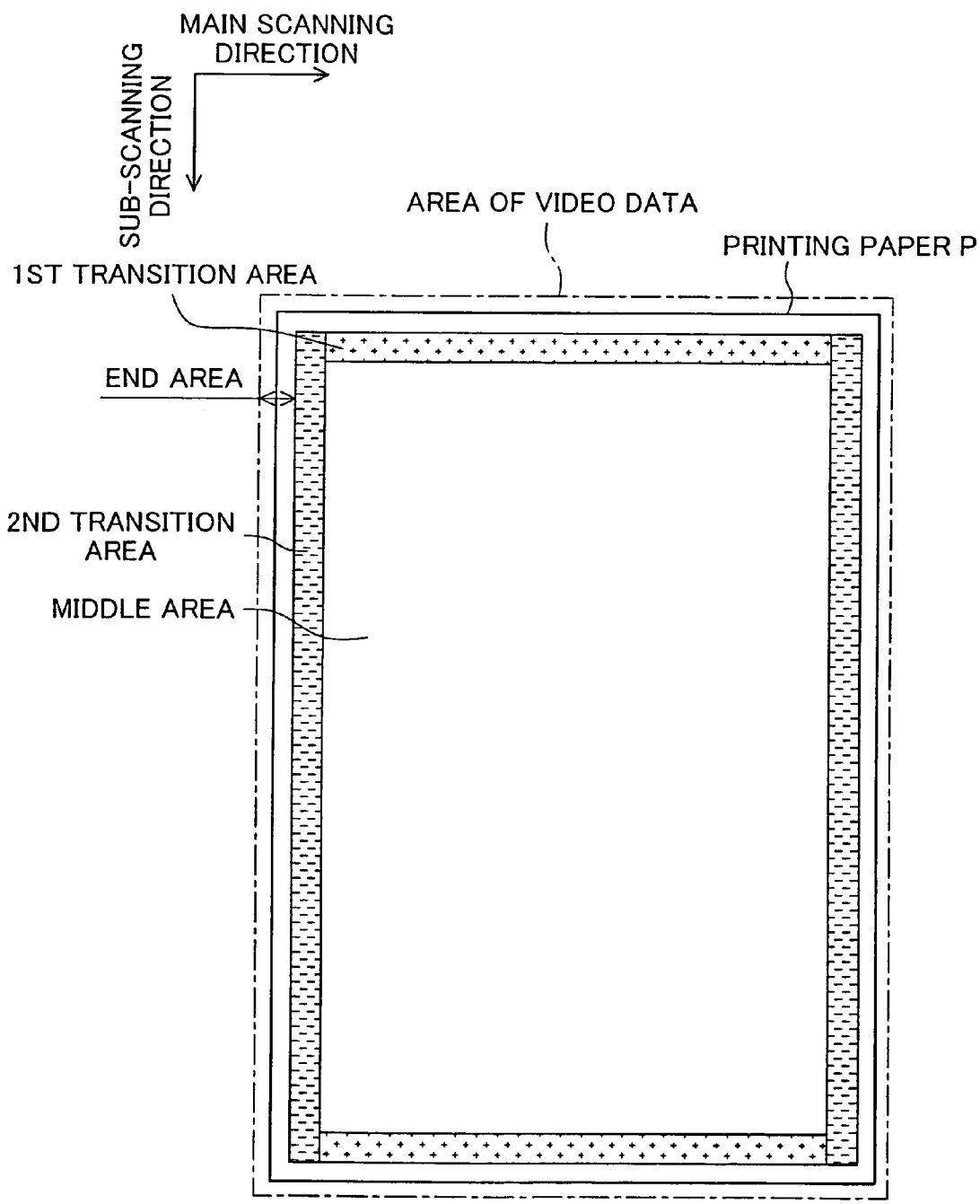

PRINTING WITH VARIED DOT-RECORDING RATE WITH RESPECT TO EACH PRINTING REGION

BACKGROUND OF THE INVENTION

1. Field of the Invention

The present invention relates to a printing technique of ejecting ink droplets to print an image on a printing medium, and more specifically to a printing technique of printing to ends of printing paper.

2. Description of the Related Art

Printers that eject inks from nozzles on a print head have widely been used as the output device of the computer. Some known printers have been developed to implement printing to ends of printing paper, as disclosed in Japanese Patent Laid-Open Gazette No. 2002-103586. One proposed method attaining rimless printing uses an ink absorption material set in grooves of a platen to absorb ink ejected outside the printing paper.

This proposed method, however, may cause problems, such as fouling of the printing device with misted ink or solid ink retention in the ink absorption material.

SUMMARY OF THE INVENTION

The object of the invention is thus to eliminate the drawbacks of the prior art described above and to implement printing to ends of a printing medium, while restraining adhesion of ink droplets to a printing device, in a printing technique of ejecting ink to formedots on the printing medium.

In order to attain the above and the other objects of the present invention, there is provided a print control method of generating print data to be supplied to a print unit to print. The print unit forms dots by ejecting an ink on a printing medium. The print control method comprises the steps of a dot data generation step of generating dot data representing a state of dot formation at each pixel according to a pixel value of given image data. The dot data generation step includes the step of generating the dot data, such that the state of dot formation with respect to at least part of the pixel values in a pixel belonging to an end area located on an end of the printing medium is different from the state of dot formation in a pixel belonging to a middle area located in a middle of the printing medium, so as to reduce adhesion of the ink to the print unit.

The print control method of the invention generates the dot data, such that the dot formation with respect to at least part of the pixel values of given video data in the pixel belonging to the end area located on the end of the printing medium is different from the dot formation in the pixel belonging to the middle area located in the middle of the printing medium, so as to prevent adhesion of ink to the printing module. This arrangement effectively ensures printing to ends of a printing medium, while restraining adhesion of ink droplets to a printing device.

The present invention is also directed to a first print control device that generates print data to be supplied to a printing module, which is used for printing and ejects ink to formedots on a printing medium. The print module includes a print head having multiple nozzles and multiple ejection actuation elements that cause the multiple nozzles to eject ink droplets. The print module is capable of actuating each nozzle to selectively form one of N different types of dots (where N is an integer of not less than 2) in an area of one pixel on the printing medium. The print control device also includes a color conversion module and a tone-decreasing module. The color conversion module converts the color of each pixel included in given first video data into tone values to be expressed by inks available in the printing module, so as to generate second video data. The tone-decreasing module generates dot data, which represent the dot formation in the respective pixels, according to the tone values of the respective pixels in the second video data. The second video data has a wider area than the area of the printing medium and is divided into an end area located on an end of the printing medium and a middle area located in a middle of the printing medium. The tone-decreasing module is designed to make a value of a specific dot recording rate with respect to an identical pixel value prior to tone-decreasing in a pixel belonging to the end area lower than a value of the specific dot recording rate in a pixel belonging to the middle area, where the specific dot recording rate represents a recording rate of a specific dot, which is at least one relatively small-size dot among the N different types of dots.

The video data is divided into the end area located on the end of the printing medium and the middle area located in the middle of the printing medium. The recording rate of the specific dot, which is at least one relatively small-size dot among the multiple different types of dots is defined as the specific dot recording rate. The first print control device of the invention sets a lower value to the specific dot recording rate in the pixel belonging to the end area than the value of the specific dot recording rate in the pixel belonging to the middle area. This arrangement effectively ensures printing to ends of printing paper, while restraining adhesion of relatively small-size ink droplets to a printing device.

In one preferable embodiment of the first print control device of the invention, the tone-decreasing module varies a dot recording rate of a greater size dot having a larger size than the size of the specific dot, in order to compensate for a difference between a value of the specific dot recording rate in the pixel belonging to the end area and a value of the specific dot recording rate in the pixel belonging to the middle area with respect to an identical pixel value.

This embodiment varies the dot recording rate of a relatively large-size dot to compensate for a decrease of the specific dot recording rate. This arrangement desirably ensures the sufficient tone fidelity, while restraining adhesion of relatively small-size ink droplets to a printing device.

In the print control device of the invention, when the printing medium is roll paper, the second video data may be set to have the end area set only on ends parallel to a sub-scanning direction of the roll paper.

In the case of printing multiple images on the roll paper, this arrangement desirably relieves the load of data processing on ends parallel to a main scanning direction of the printing medium in the area of the given video data, while preventing deterioration of the picture quality due to a decrease in specific dot recording rate.

In another preferable embodiment of the first print control device of the invention, the tone-decreasing module includes a dot recording rate table storage module and a table selection module. The dot recording rate table storage module stores an end-area dot recording rate table to be applied to the pixel belonging to the end area and a middle-area dot recording rate table to be applied to the pixel belonging to the middle area. The table selection module selects the end-area dot recording rate table for the pixel belonging to the end area, while selecting the middle-area dot recording rate table for the pixel belonging to the middle area.

In one preferable application of the print control device of this embodiment, the second video data further includes a transition area between the end area and the middle area, and the tone-decreasing module has an interpolation module that carries out an interpolation with the end-area dot recording rate table and the middle-area dot recording rate table, so as to determine a value of the specific dot recording rate in the transition area. In another preferable application of the print control device of this embodiment, the second video data further includes a transition area between the end area and the middle area, and the dot recording rate table storage module further stores a transition-area dot recording rate table to be applied to a pixel belonging to the transition area. The table selection module selects the transition-area dot recording rate table for the pixel belonging to the transition area. The transition-area dot recording rate table is configured to have a setting of the specific dot recording rate with respect to an identical pixel value prior to tone-decreasing, which is higher than a setting of the specific dot recording rate in the end-area dot recording rate table but is lower than a setting of the specific dot recording rate in the middle-area dot recording rate table.

The arrangements of these applications desirably prevent the occurrence of any false contour and potential deterioration of the picture quality due to an abrupt change of the dot pattern between the end area and the middle area.

In the print control device of the latter preferable application, the dot recording rate table storage module stores multiple transition-area dot recording rate tables having mutually different settings of the specific dot recording rate with respect to an identical pixel value prior to tone-decreasing. The table selection module selects one among the multiple transition-area dot recording rate tables, based on a position of each pixel in the transition area, such that a transition-area dot recording rate table having a higher setting of the specific dot recording rate with respect to the identical pixel value prior to tone-decreasing is selected according to the position of the pixel closer to the middle area. The multiple transition-area dot recording rate tables are designed to have settings of the specific dot recording rate with respect to the identical pixel value prior to tone-decreasing, which are higher than the setting of the specific dot recording rate in the end-area dot recording rate table but are lower than the setting of the specific dot recording rate in the middle-area dot recording rate table.

This arrangement effectively prevents potential deterioration of the picture quality due to an abrupt change of a dot pattern between the end area and the middle area.

In one preferable embodiment of the print control device of the former application, the tone-decreasing module generates the dot data with respect to each main scanning line as a set of pixels adjoining to one another in a main scanning direction. The interpolation module, in the case of failed processing of one main scanning line with an identical dot recording rate table, carries out an interpolation with the end-area dot recording rate table and the middle-area dot recording rate table, so as to determine a value of the specific dot recording rate in the transition area. In another preferable embodiment of the print control device of the former application, the tone-decreasing module generates the dot data with respect to each sub-scanning line as a set of pixels adjoining to one another in a sub-scanning direction. The interpolation module, in the case of failed processing of one sub-scanning line with an identical dot recording rate table, carries out an interpolation with the end-area dot recording rate table and the middle-area dot recording rate table, so as to determine a value of the specific dot recording rate in the transition area.

The arrangements of these embodiments desirably accelerate the processing speed of generating the dot data.

The present invention is further directed to a second print control device that generates print data to be supplied to a printing module, which is used for printing and ejects plurality of different inks to formedots on a printing medium. The second print control device has a dot data generation module that generates dot data, which represent a dot formation in respective pixels, according to pixel values of given video data with regard to the respective pixels. The dot data generation module includes a color conversion table storage module and a color conversion module. The color conversion table storage module stores a middle-area color conversion table to be applied to a pixel belonging to a middle area located in a middle of the printing medium and an end-area color conversion table to be applied to a pixel belonging to an end area located on an end of the printing medium. Here the end-area color conversion table is configured to have a smaller setting of a total ink ejection quantity of the plurality of different inks with respect to an identical pixel value of the given video data than a setting of the total ink ejection quantity in the middle-area color conversion table. The color conversion module selects the end-area color conversion table for the pixel belonging to the end area, while selecting the middle-area color conversion table for the pixel belonging to the middle area. The color conversion module carries out color conversion with the selected color conversion table with regard to each pixel belonging to either of the end area and the middle area, while carrying out color conversion with the end-area color conversion table and the middle-area color conversion table with regard to each pixel belonging to a transition area located between the end area and the middle area to surround the middle area. The color conversion module carries out the color conversion with regard to the pixel belonging to the transition area, so as to make a value of the total ink ejection quantity with respect to the identical pixel value of the given video data in the pixel belonging to the transition area greater than a value of the total ink ejection quantity in the pixel belonging to the end area but smaller than a value of the total ink ejection quantity in the pixel belonging to the middle area.

The second print control device of the invention carries out color conversion to make the value of the total ink ejection quantity with respect to the identical pixel value of the given video data in the pixel belonging to the transition area, which is located between the end area on the end of the printing medium and the middle area in the middle of the printing medium, greater than the value of the total ink ejection quantity in the pixel belonging to the end area but smaller than the value of the total ink ejection quantity in the pixel belonging to the middle area. This arrangement effectively prevents potential deterioration of the picture quality in the vicinity of the ends of the printing medium.

In one preferable embodiment of the second print control device of the invention, the printing module is capable of ejecting cyan ink, magenta ink, yellow ink, and black ink. The end-area color conversion table is configured to have a smaller setting of an ejection quantity sum of the cyan, magenta, and yellow inks than a setting of the ejection quantity sum in the middle-area color conversion table and to increase an ejection quantity of the black ink and thereby compensate for a color change due to a decrease in ejection quantity sum. In another preferable embodiment of the second print control device of the invention, the printing module is capable of ejecting a dark ink having a relatively high density and a light ink having a relatively low density.

The end-area color conversion table is configured to have a smaller setting of an ejection quantity of the light ink than a setting of the ejection quantity of the light ink in the middle-area color conversion table and to increase an ejection quantity of the dark ink and thereby compensate for a color change due to a decrease in ejection quantity of the light ink. The arrangements of these two embodiments may be applied in combination.

Typical examples of the dark ink include cyan ink, magenta ink, and black ink, and typical examples of the light ink include light cyan ink, light magenta ink, and light black ink.

The printing module may be designed to additionally eject red ink, which expresses a color approximate to the color expressed by a combination of magenta ink and yellow ink. In this modified structure, the end-area color conversion table is configured to decrease an ejection quantity sum of the magenta ink and the yellow ink and to increase the ejection quantity of the red ink and thereby compensate for a color change due to the decrease of the ejection quantity sum of the magenta ink and the yellow ink.

In still another preferable embodiment of the second print control device of the invention, the color conversion module carries out an interpolation with the end-area color conversion table and the middle-area color conversion table to implement the color conversion with regard to a pixel belonging to the transition area. In another preferable embodiment, the second print control device of the invention has an area division module that divides the transition area into a first transition area, which is extended in a direction parallel to a main scanning direction, and a second transition area, which is other than the first transition area. The dot data generation module sequentially generates the dot data in the main scanning direction. The color conversion table storage module further stores a first transition-area color conversion table that is configured to have a setting of the total ejection quantity of the plurality of different inks with regard to an identical pixel value of the given video data, which is greater than a setting of the total ejection quantity in the end-area color conversion table but is smaller than a setting of the total ejection quantity in the middle-area color conversion table. The color conversion module applies the first transition-area color conversion table to a pixel belonging to the first transition area to generate the dot, while carrying out an interpolation with the end-area color conversion table and the middle-area color conversion table to generate the dot data with regard to a pixel belonging to the second transition area.

The arrangements of these embodiments desirably prevent the occurrence of any false contour and potential deterioration of the picture quality due to an abrupt change of the ink ejection state between the end area and the middle area.

In still another preferable embodiment, the second print control device of the invention has an area division module that determines the end area, the middle area, and the transition area according to a printing environment, which includes at least one of a type and a size of the printing medium.

The marginal width is determined according to the size and the type of printing paper. This arrangement advantageously reduces the marginal width, which may cause protrusion of a printed image over the proper range, while ensuring printing to ends of the printing paper.

In another preferable embodiment, the second print control device of the invention has a user interface module that allows for a user's entry used to set at least one of the end area, the middle area, and the transition area, and an area division module that determines the end area, the middle area, and the transition area, based on the user's entry.

The present invention is further directed to a third print control device that generates print data to be supplied to a printing module, which is used for printing and ejects ink to form dots on a printing medium, while carrying out main scan of a print head having multiple nozzles and multiple ejection actuation elements that cause the multiple nozzles to eject ink droplets. The printing module is capable of actuating each nozzle of the print head to selectively form one of N different types of dots (where N is an integer of not less than 2) in an area of one pixel on the printing medium. The third print control device has a dot data generation module that generates dot data, which represent a dot formation in respective pixels sequentially in a main scanning direction, according to pixel values of given video data with regard to the respective pixels. The dot data generation module includes a dot recording rate table storage module, a first dot recording rate determination module, and a second dot recording rate determination module. The dot recording rate table storage module stores an end-area dot recording rate table to be applied to a pixel belonging to an end area located on an end of the printing medium, a middle-area dot recording rate table to be applied to a pixel belonging to a middle area located in a middle of the printing medium, and a first transition-area dot recording rate table to be applied to a pixel belonging to a first transition area that is extended in a direction parallel to the main scanning direction as part of a transition area, which is located between the end area and the middle area to surround the middle area. The first dot recording rate determination module selects the end-area dot recording rate table for the pixel belonging to the end area, while selecting the middle-area dot recording rate table for the pixel belonging to the middle area and selecting the first transition-area dot recording rate table for the pixel belonging to the first transition area. The first dot recording rate determination module determines dot recording rates of the N different types of dots with the selected dot recording rate table with regard to each pixel belonging to one of the end area, the middle area, and the first transition area. The second dot recording rate determination module carries out an interpolation with the end-area dot recording rate table and the middle-area dot recording rate table to determine dot recording rates of the N different types of dots in a second transition area, which is a residual transition area other than the first transition area as a remaining part of the transition area, which is located between the end area and the middle area to surround the middle area. The end-area dot recording rate table is configured to have a lower setting of a specific dot recording rate with respect to an identical pixel value than a setting of the specific dot recording rate in the middle-area dot recording rate table, where the specific dot recording rate represents a recording rate of a specific dot, which is at least one relatively small-size dot among the N different types of dots. The first transition-area dot recording rate table is configured to have a setting of the specific dot recording rate with respect to the identical pixel value, which is higher than the setting of the specific dot recording rate in the end-area dot recording rate table but is lower than the setting of the specific dot recording rate in the middle-area dot recording rate table.

In the third print control device of the invention, the transition area located between the end area and the middle area to surround the middle area is divided into the first transition area that is extended in the direction parallel to the main scanning direction, and the second transition area that is other than the first transition area. The first transition area allows for generation of the dot data sequentially in the main scanning direction without any changeover of selection of the dot recording rate table. The dot recording rates of the N different types of dots are thus determined according to the selected dot recording rate table in the first transition area. The second transition area, on the other hand, does not allow for generation of the dot data sequentially in the main scanning direction without a changeover of selection of the dot recording rate table. The dot recording rates of the N different types of dots are thus determined by an interpolation in the second transition area. Execution of the optimum processing for each division of the transition area ensures prompt generation of the dot data with respect to the pixels belonging to the transition area located between the end area and the middle area.

In the third print control device of the above structure, the main scanning direction may be replaced with a sub-scanning direction.

In one preferable embodiment of the third print control device of the invention, the second dot recording rate determination module carries out a linear interpolation to determine the dot recording rates of the N different types of dots in the second transition area. This arrangement ensures the high-speed tone-decreasing for the pixels belonging to the second transition area.

The linear interpolation may be replaced with an on-linear interpolation according to a non-linear mathematical formula. The non-linear interpolation has a lower processing speed but an advantageously higher degree of freedom in the interpolating operation than the linear interpolation.

In another preferable embodiment of the third print control device of the invention, the printing module is capable of further ejecting a quality-enhancing ink, which is used to improve quality of a resulting print, to form transparent dots on the printing medium. The dot data generation module generates dot data, which represent a dot formation of the transparent dot with the quality-enhancing ink in the respective pixels, according to the pixel values of the given video data with regard to the respective pixels. The dot recording rate table storage module further stores multiple transparent dot recording rate tables representing multiple dot recording rates of the transparent dot. The table selection module changes over selection of one among the multiple transparent dot recording rate tables, only in response to a changeover of a selected dot recording rate table to be applied to tone-decreasing of dots formed with an ink other than the quality-enhancing ink among inks available in the printing module.

This arrangement determines the dot recording rate of the transparent dot with the quality-enhancing ink, without excessively complicating the processing. For example, selection of the transparent dot recording rate table is changed over, simultaneously with a changeover of the dot recording rate table for another color ink in the first transition area. This desirably restricts an increase in frequency of the changeover of the dot recording rate table.

The technique of the invention is actualized by any of other diverse applications, which include printing devices, computer programs that cause the computer to attain the respective functions of the methods and the devices discussed above, recording media in which such computer programs are recorded, and data signals that include such computer programs and are embodied in carrier waves.

BRIEF DESCRIPTION OF THE DRAWINGS

FIG. 5 shows the structure of a nozzle Nz and a piezoelectric element PE;

FIGS. 15(a) and 15(b) are a plan view and a graph showing an area of video data relative to the area of printing paper P in a third embodiment of the invention;

FIGS. 20(a) and 20(b) show a process of tone-decreasing in first transition areas in the fifth embodiment of the invention;

FIG. 30 is a table showing optimum marginal widths corresponding to respective sizes and types of printing paper, where the optimum marginal width represents a minimum possible marginal width that ensures printing to ends of printing paper; and FIG. 31 is a plan view showing an area of resolution-converted video data relative to the area of printing paper P in one modified example.

DESCRIPTION OF THE PREFERRED EMBODIMENTS

Some modes of carrying out the invention are discussed below as preferred embodiments in the following sequence:
A. Configuration of System
B. Print Data Generation Process of First Embodiment
C. Print Data Generation Process of Second Embodiment
D. Print Data Generation Process of Third Embodiment
E. Print Data Generation Process of Fourth Embodiment
F. Print Data Generation Process in Fifth Embodiment
G. Print Data Generation Process in Sixth Embodiment
H. Print Data Generation Process in Seventh Embodiment
I. Modifications

A. Configuration of System

Figure 1:
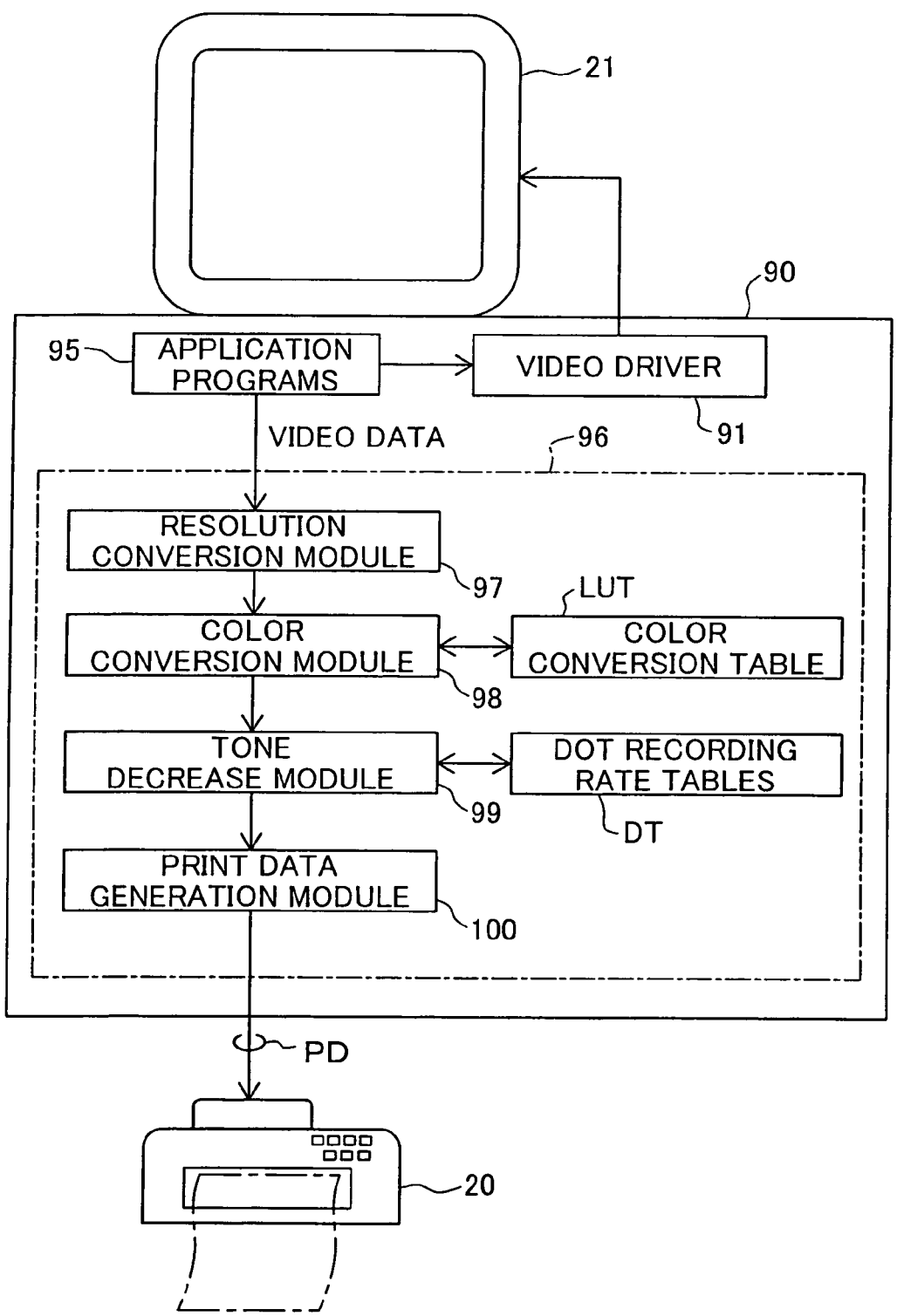
FIG. 1 is a block diagram showing the configuration of a printing system in one embodiment of the invention.

FIG. 1 is a block diagram schematically illustrating the configuration of a printing system in one embodiment of the invention. This printing system includes a computer 90 functioning as a printing control apparatus and a color printer 20 functioning as a print unit. The combination of the color printer 20 with the computer 90 is regarded as a "printing apparatus" in the broad sense.

Application program 95 operates on computer 90 under a specific operating system. A video driver 91 and a printer driver 96 are incorporated in the operating system. The application program 95 outputs image data, which goes through a series of image processing in the printer driver 96 and is given as print data PD to the color printer 20. The application program 95 also outputs image data to display a processed image on a CRT 21 via the video driver 91.

The printer driver 96 includes a resolution conversion module 97, a color conversion module 98, a color-quantizing module 99, a print data generation module 100, multiple color conversion tables LUT, and a dot rate table DT. The functions of these constituents will be discussed later.

The printer driver 96 is equivalent to a program functioning to generate the print data PD. The program of attaining the functions of the printer driver 96 is supplied in the form recorded in a computer readable recording medium. Typical examples of such computer readable recording medium include flexible disks, CD-ROMs, magneto-optic disks, IC cards, ROM cartridges, punched cards, prints with barcodes or other codes printed thereon, internal storage devices (memories like RAM and ROM) and external storage devices of the computer, and a diversity of other computer readable media.

Figure 2:
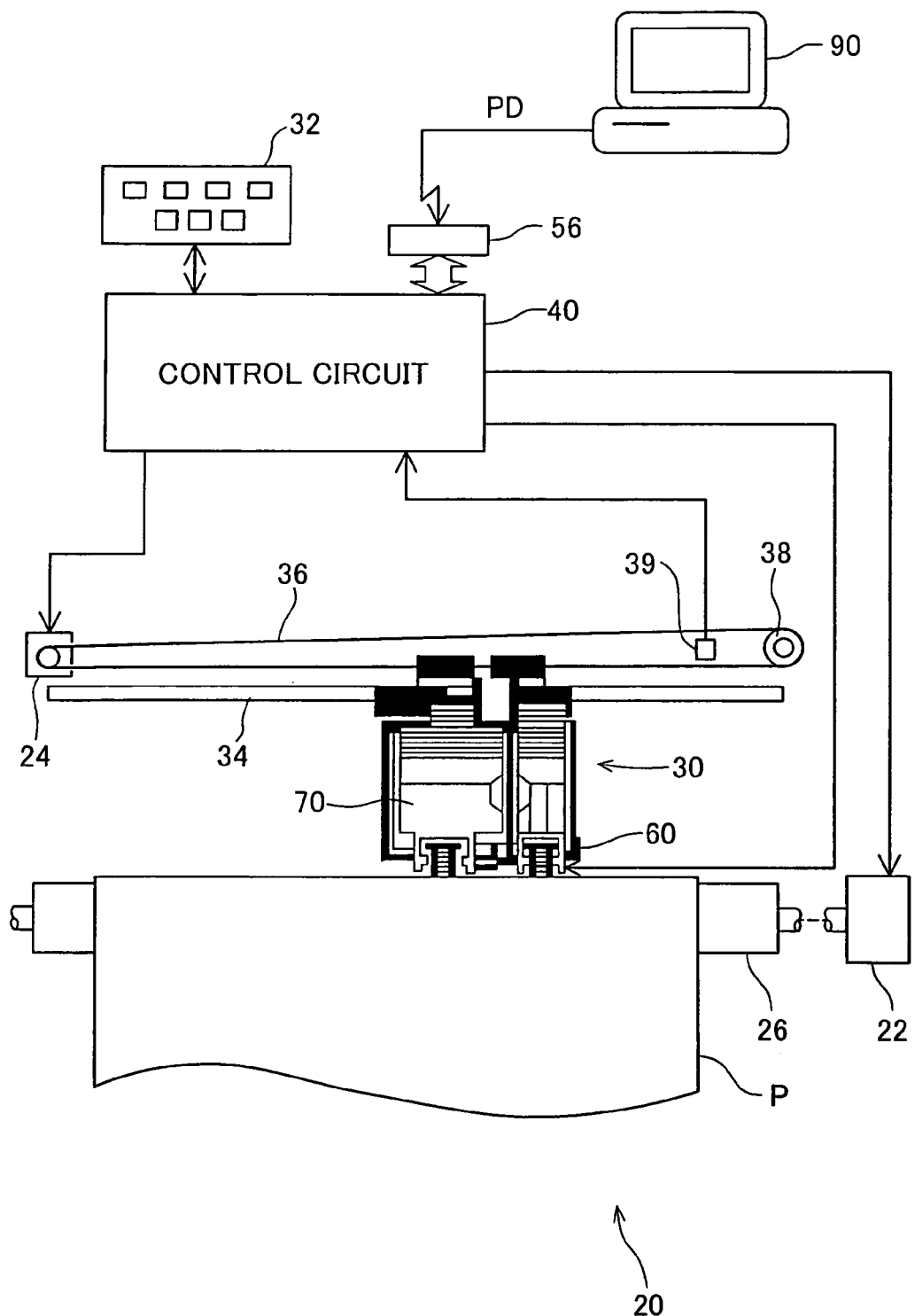
FIG. 2 schematically illustrates the structure of a color printer 20.

FIG. 2 schematically illustrates the structure of the color printer 20. The color printer 20 has a sub-scan drive unit that activates a paper feed motor 22 to feed a sheet of printing paper P in a sub-scanning direction, a main scan drive unit that activates a carriage motor 24 to move a carriage 30 back and forth in an axial direction of a paper feed roller 25 (in a main scanning direction), a head drive mechanism that drives a print head unit 60 (also called 'print head assembly') mounted on the carriage 30 to control ink ejection and dot formation, and a control circuit 40 that transmits signals to and from the paper feed motor 22, the carriage motor 24, the print head unit 60, and an operation panel 32. The control circuit 40 is connected to the computer 90 via a connector 56.

The sub-scan drive unit for feeding the printing paper P has a non-illustrated gear train to transmit rotation of the paper feed motor 22 to the paper feed roller 25. The main scan drive unit for reciprocating the carriage 30 has a sliding shaft 34 that is arranged in parallel with the axis of the paper feed roller 25 to hold the carriage 30 in a slidable manner, a pulley 38 that supports an endless drive belt 36 spanned between the carriage motor 24 and the pulley 38, and a position sensor 39 that detects the position of the origin of the carriage 30.

Figure 3A:
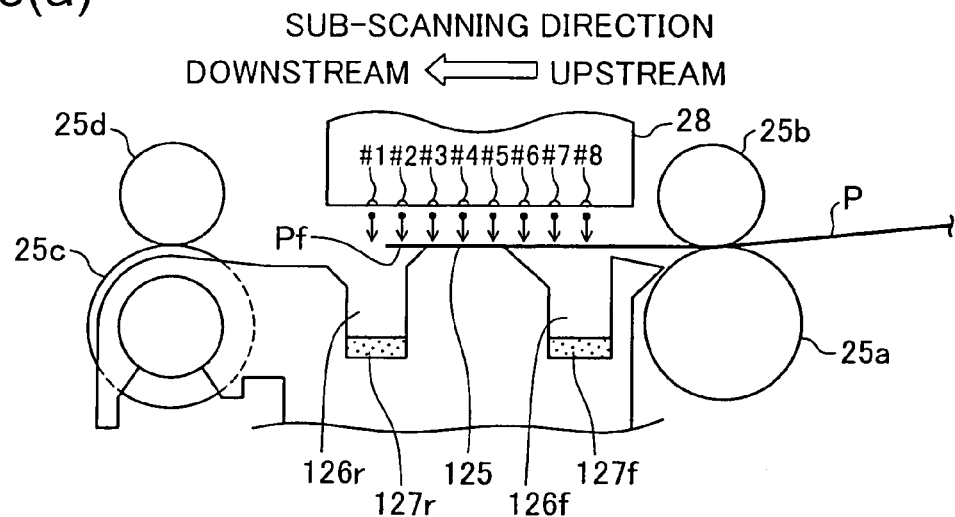
FIGS. 3(a), 3(b), and 3(c) show printing on respective ends of printing paper P.
Figure 3B:
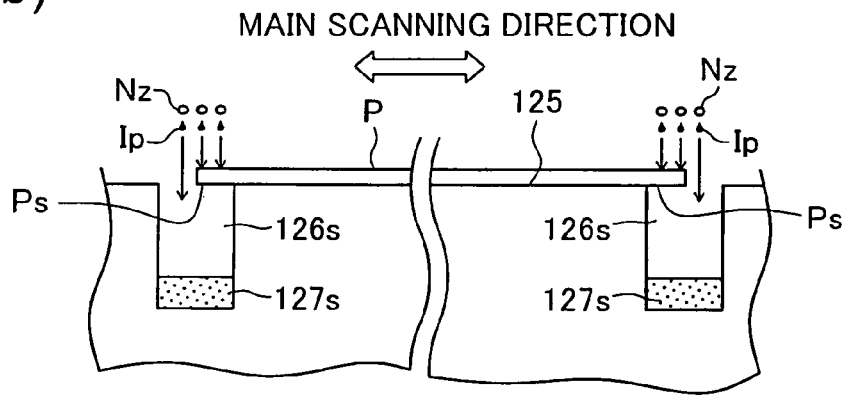
Figure 3C:
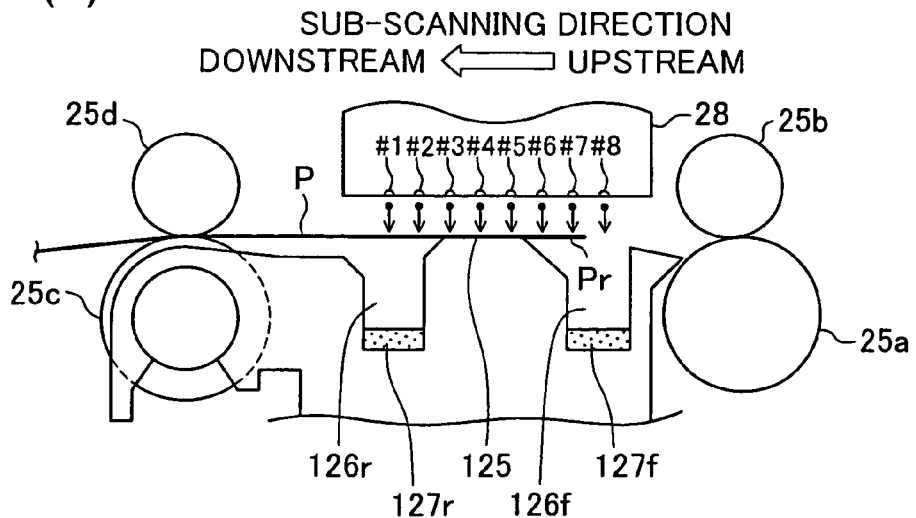

FIGS. 3(a), 3(b), and 3(c) show printing on respective ends of printing paper P. Two nozzles #1 and #2 on the print head 28 are located above the opening of a downstream groove 126r, and two other nozzles #7 and #8 are located above the opening of an upstream groove 126f. Other nozzles #3, #4, #5, and #6 are located above a platen frame 125. As shown in FIG. 3(b), each side end Ps of the printing paper P is positioned above the opening of a side groove 126s. Ink absorption materials 127r, 127f, and 127s for absorbing ink are respectively set in the downstream groove 126r, the upstream groove 126f, and the side grooves 126s.

Each of the four nozzles #1, #2, #7, and #8 is located on the opening of the downstream groove 126r or on the opening of the upstream groove 126f. Unless the ejected ink is misted, ink ejection prior to a shift of the printing paper P to the position by the sub-scan feed does not cause the platen frame 125 and the roller 25d to be stained with ink. The color printer 20 implements printing, while actuating at least either of upstream paper feed rollers 25a and 25b and downstream paper feed rollers 25c and 25d to feed the printing paper P in the sub-scanning direction. The upstream paper feed rollers 25a and 25b and the downstream paper feed rollers 25c and 25d are included in the paper feed roller 25.

FIG. 3(a) shows a printing process on a front end Pf of the printing paper P. The two nozzles #1 and #2 start ink ejection a little before the front end Pf of the printing paper P reaches the effective recording positions of these nozzles #1 and #2. Even in the presence of some paper feed error, this arrangement does not make any undesirable margin but ensures printing to the front end Pf of the printing paper P, while protecting the platen frame 125 and the roller 25d from stains of ink.

FIG. 3(b) shows a printing process on side ends Ps of the printing paper P. Each side end Ps of the printing paper P is located above the opening of the side groove 126s. This arrangement does not make any undesirable margin but ensures printing to the side ends Ps of the printing paper P.

FIG. 3(c) shows a printing process on a rear end Pr of the printing paper P. The two nozzles #7 and #8 stop ink ejection after the rear end Pr of the printing paper P passes through the effective recording positions of these nozzles #7 and #8. Even in the presence of some paper feed error, this arrangement does not make any undesirable margin but ensures printing to the rear end Pr of the printing paper P, while protecting the platen frame 125 and the roller 25d from stains of ink.

The ejected ink droplets of significantly small sizes are, however, not successfully absorbed by the ink absorption members 127r, 127f, and 127s, but may be floated in the color printer 20. The present invention provides a technique of eliminating this problem as discussed below.

Figure 4:
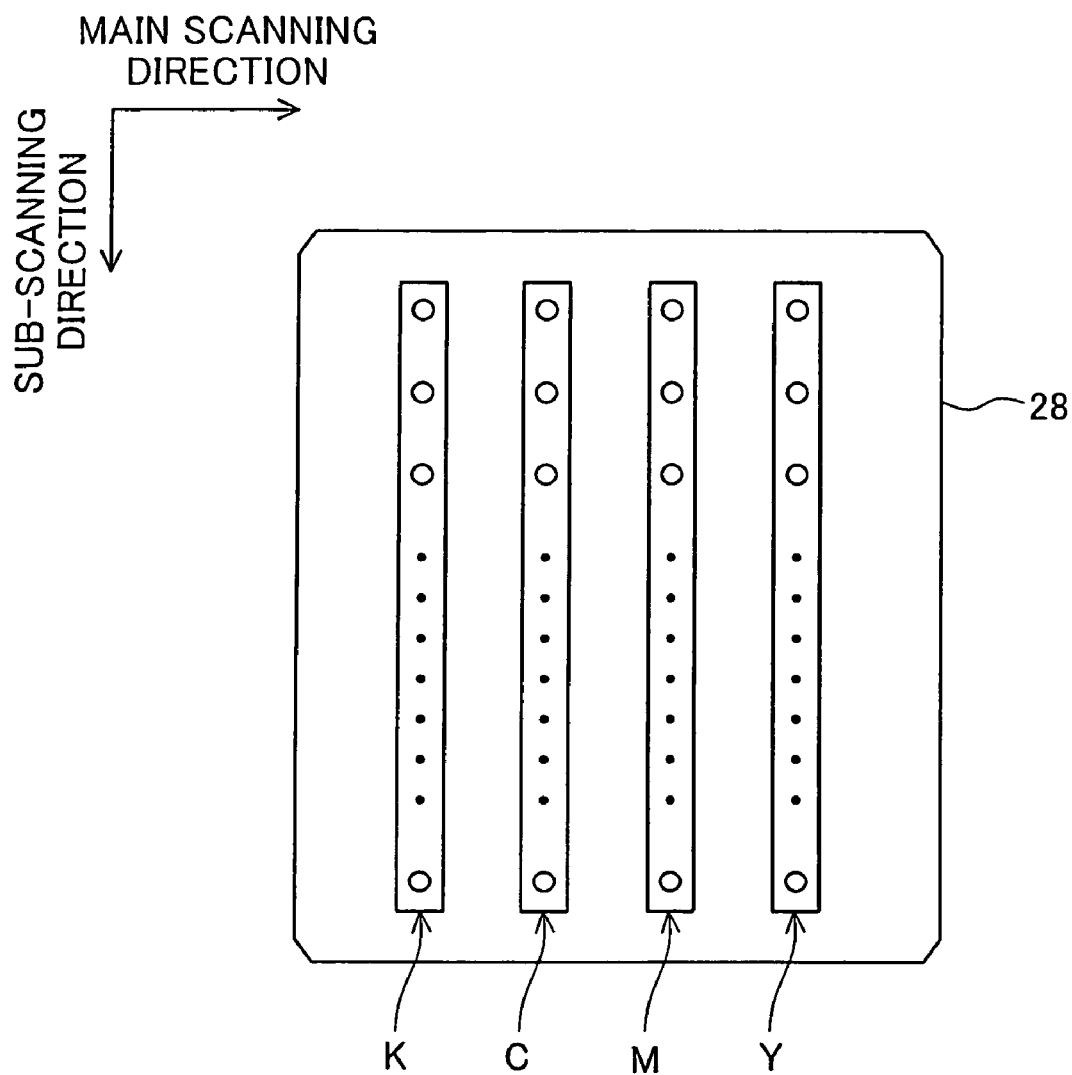
FIG. 4 shows an arrangement of nozzles on a bottom face of a print head 28.

FIG. 4 shows an arrangement of nozzles on the bottom face of the print head 28. The bottom face of the print head 28 has a black ink nozzle array K for ejection of black ink, a cyan ink nozzle array C for ejection of cyan ink, a magenta ink nozzle array M for ejection of magenta ink, and a yellow ink nozzle array Y for ejection of yellow ink.

Each nozzle is provided with a piezoelectric element as an ejection-actuating element to actuate the nozzle for ejection of an ink droplet as described below. In the printing process, the print head 28 ejects ink droplets from the respective nozzles, while moving in the main scanning direction.

FIG. 5 shows the structure of a nozzle Nz and a piezoelectric element PE. The piezoelectric element PE is located at a position in contact with an ink passage 68 that leads the flow of ink to the nozzle Nz. In the structure of the embodiment, a voltage is applied between electrodes provided on both ends of the piezoelectric element PE to deform one side wall of the ink passage 68 and thereby attain high-speed ejection of an ink droplet Ip from the end of the nozzle Nz.

Figure 6A:
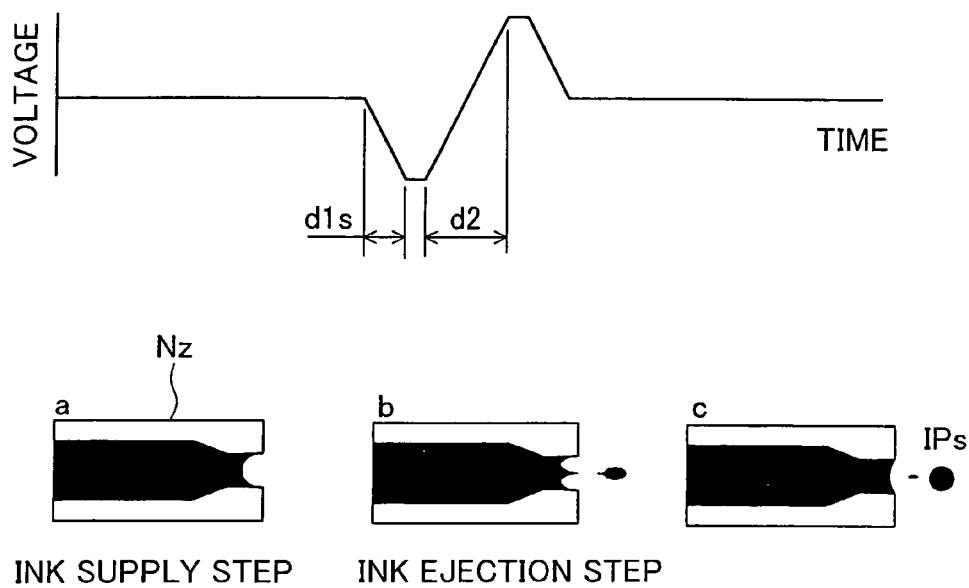
FIGS. 6(a) and 6(b) show two driving waveforms of the nozzle Nz for ink ejection and resulting small-size and medium-size ink droplets IPs and IPm ejected in response to the driving waveforms.
Figure 6B:
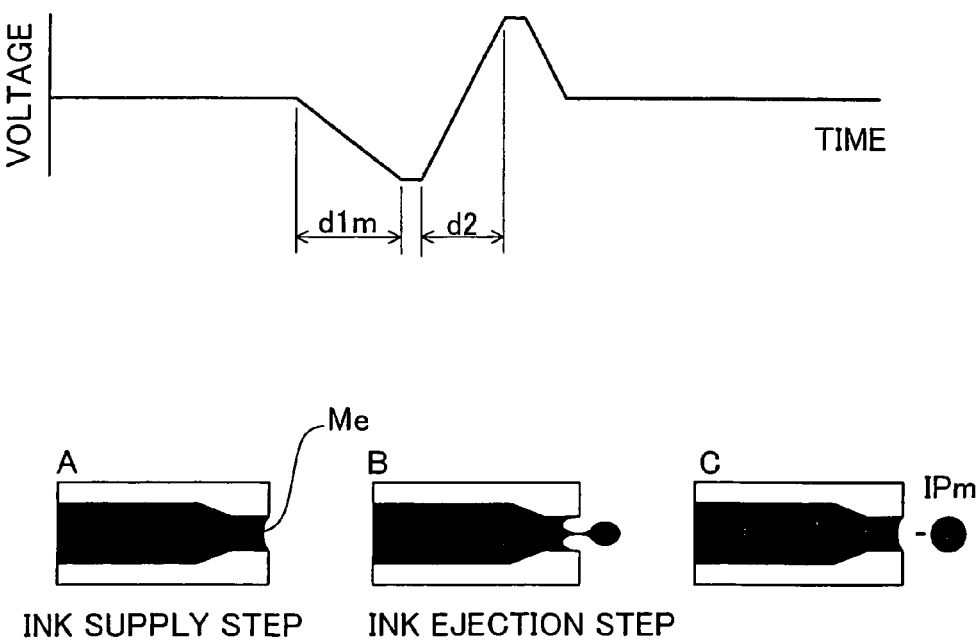

FIGS. 6(a) and 6(b) show two driving waveforms of the nozzle Nz for ink ejection and resulting small-size and medium-size ink droplets IPs and IPm ejected in response to the driving waveforms. FIG. 6(a) shows a driving waveform to eject a small-size ink droplet IPs that independently forms a small-size dot. FIG. 6(b) shows a driving waveform to eject a medium-size ink droplet IPm that independently forms a medium-size dot. The small-size dot of this embodiment corresponds to the 'specific dot' in the claims of the invention.

The small-size ink droplet IPs is ejected from the nozzle Nz by two steps given below, that is, an ink supply step and an ink ejection step:

(1) Ink supply step (d1s): The ink passage 68 (see FIG. 5) is expanded at this step to receive a supply of ink from a non-illustrated ink tank. A decrease in potential applied to the piezoelectric element PE contracts the piezoelectric element PE and thereby expands the ink passage 68; and (2) Ink ejection step (d2): The ink passage 68 is compressed to eject ink from the nozzle Nz at this step. An increase in potential applied to the piezoelectric element PE expands the piezoelectric element PE and thereby compresses the ink passage 68.

The medium-size ink droplet IPm is formed by decreasing the potential applied to the piezoelectric element PE at a relatively low speed in the ink supply step as shown in FIG. 6(b). A relatively gentle slope of the decrease in potential slowly expands the ink passage 68 and thus enables a greater amount of ink to be fed from the non-illustrated ink tank.

The high decrease rate of the potential causes an ink interface Me to be pressed significantly inward the nozzle Nz, prior to the ink ejection step as shown in FIG. 6(a). This reduces the size of the ejected ink droplet. The low decrease rate of the potential, on the other hand, causes the ink interface Me to be pressed only slightly inward the nozzle Nz, prior to the ink ejection step as shown in FIG. 6(b). This increases the size of the ejected ink droplet. The procedure of this embodiment varies the size of the ejected ink droplet by varying the rate of change in potential in the ink supply step.

Figure 7:
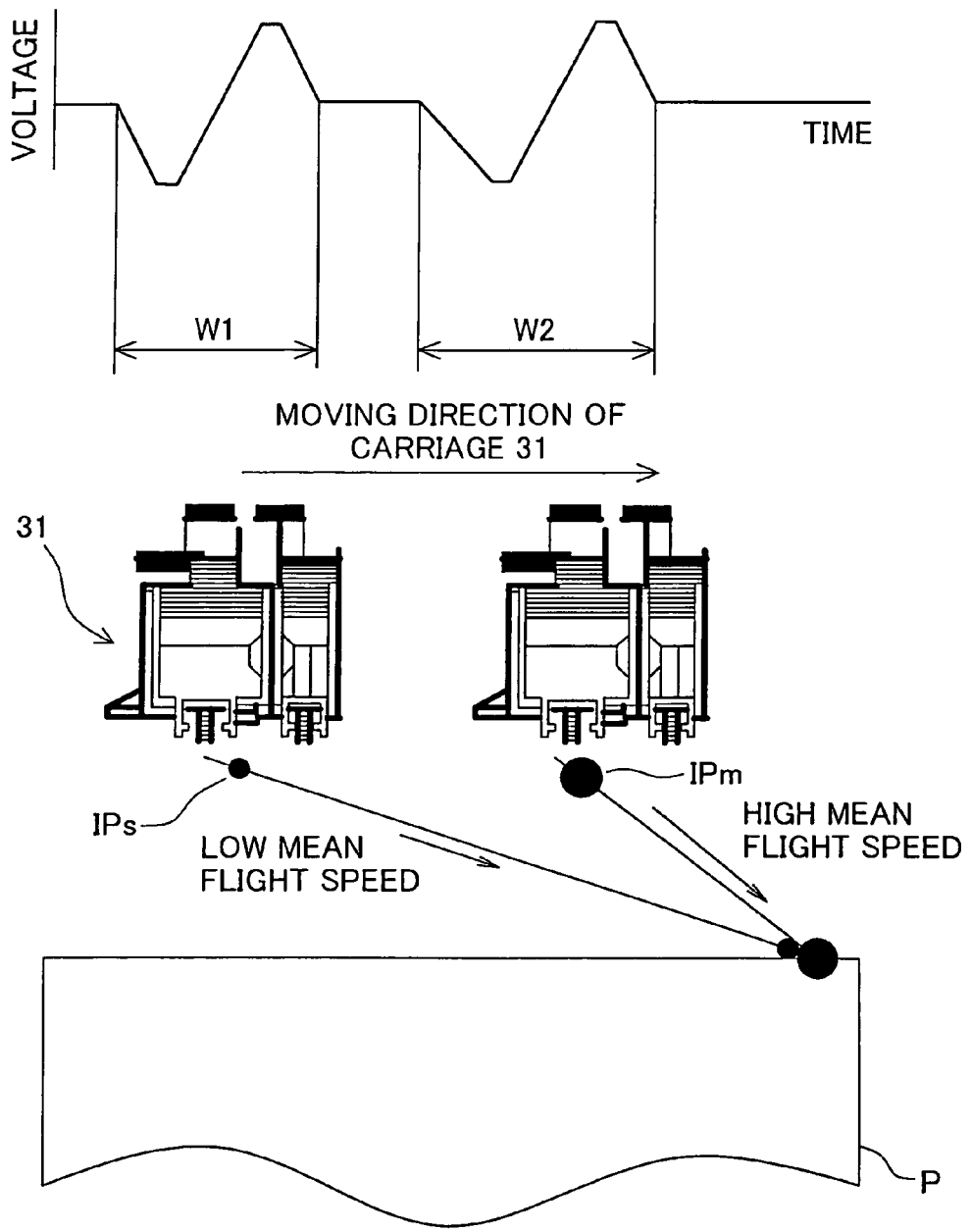
FIG. 7 shows a process of using the small-size and medium-size ink droplets IPs and IPm to form three variable-size dots, that is, large-size, medium-size, and small-size dots, at an identical position.

FIG. 7 shows a process of using the small-size and medium-size ink droplets IPs and IPm to form three variable-size dots, that is, large-size, medium-size, and small-size dots, at an identical position. A driving waveform W1 is output to eject the small-size ink droplet IPs, and a driving waveform W2 is output to eject the medium-size ink droplet IPm. As clearly understood from FIG. 7, in the structure of this embodiment, the driving waveform W2 for ejection of the medium-size ink droplet IPm is output after a predetermined time period elapsed since output of the driving waveform W1 for ejection of the small-size ink droplet IPs.

The two driving waveforms W1 and W2 are output to the piezoelectric element PE at these timings, so that the medium-size ink droplet IPm reaches the same hitting position as the hitting position of the small-size ink droplet IPs. As clearly shown in FIG. 7, ejection of the medium-size ink droplet IPm having a relatively high mean flight speed after the predetermined time period elapsed since ejection of the small-size ink droplet IPs having a relatively low mean flight speed enables the two variable-size ink droplets IPs and IPm to reach at substantially the same hitting positions. The mean flight speed represents the average value of flight speed from ejection to hitting against printing paper and decreases with an increase in speed reduction rate.

The ejection speeds of the small-size ink droplet IPs and the medium-size ink droplet IPm are remarkably higher than the moving speed of the carriage 31 in the main scanning direction. The small-size ink droplet IPs is thus not flown alone but is joined with the subsequently ejected medium-size ink droplet IPm to form a large-size ink droplet IPL for formation of a large-size dot. For the purpose of better understanding, the moving speed of the carriage 31 in the main scanning direction is exaggerated in FIG. 7.

The color printer 20 having the hardware configuration described above actuates the piezoelectric elements of the print head 28, simultaneously with a feed of printing paper P by means of the paper feed motor 22 and reciprocating movements of the carriage 30 by means of the carriage motor 24. Ink droplets of respective colors are thus ejected to form large-size, medium-size, and small-size ink dots and form a multi-color, multi-tone image on the printing paper P.

B. Print Data Generation Process in First Embodiment

Figure 8:
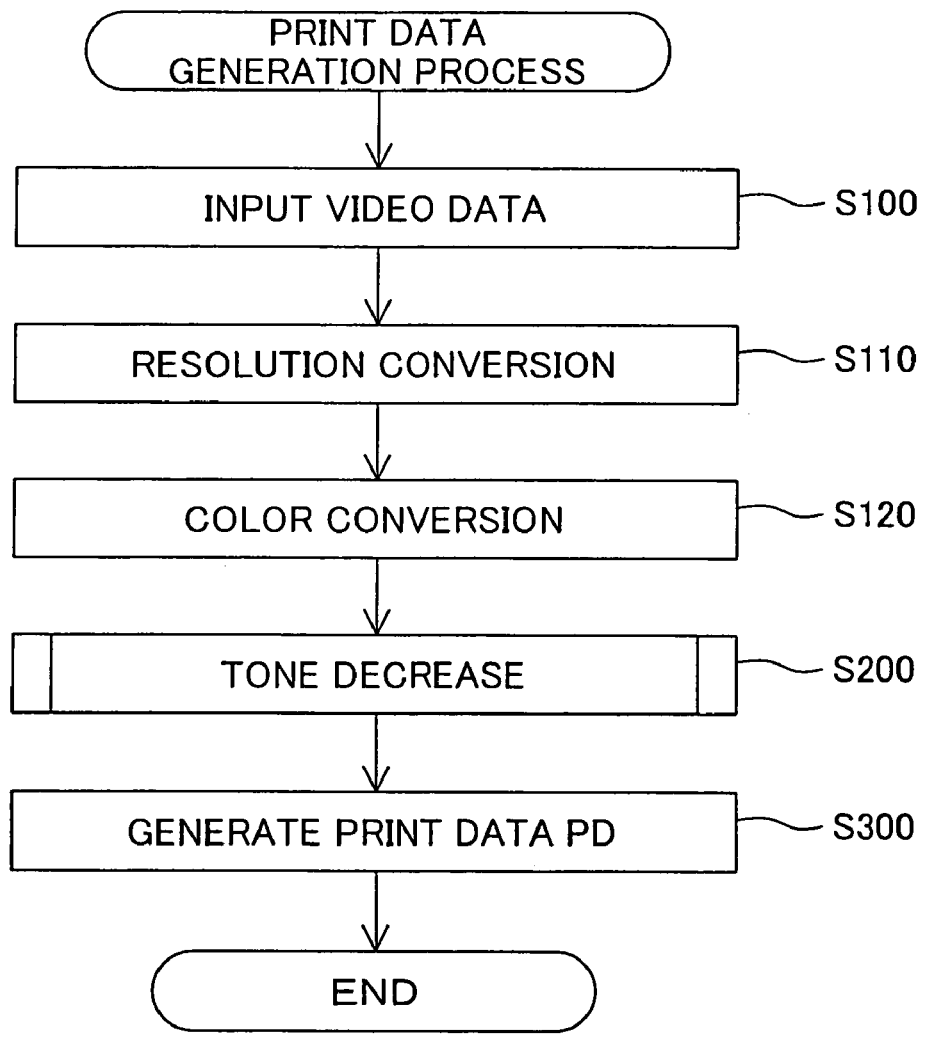
FIG. 8 is a flowchart showing a routine of print data generation process executed in the first embodiment.

FIG. 8 is a flowchart showing a routine of the print data generation process executed in the first embodiment. The print data generation process is executed by the computer 90 to generate print data PD, which is to be supplied to the color printer 20. It is here assumed that a print mode currently set implements printing to respective ends of printing paper P.

At step S100, the printer driver 96 (FIG. 1) inputs image data from the application programs 95. The input of the image data is triggered by a printing instruction given by the application programs 95. Here the image data are RGB data.

At step S110, the resolution conversion module 97 converts the resolution (that is, the number of pixels per unit length) of the input RGB video data into a predetermined resolution. The predetermined resolution is set to have a printable area to the respective ends of the printing paper P.

Figure 9:
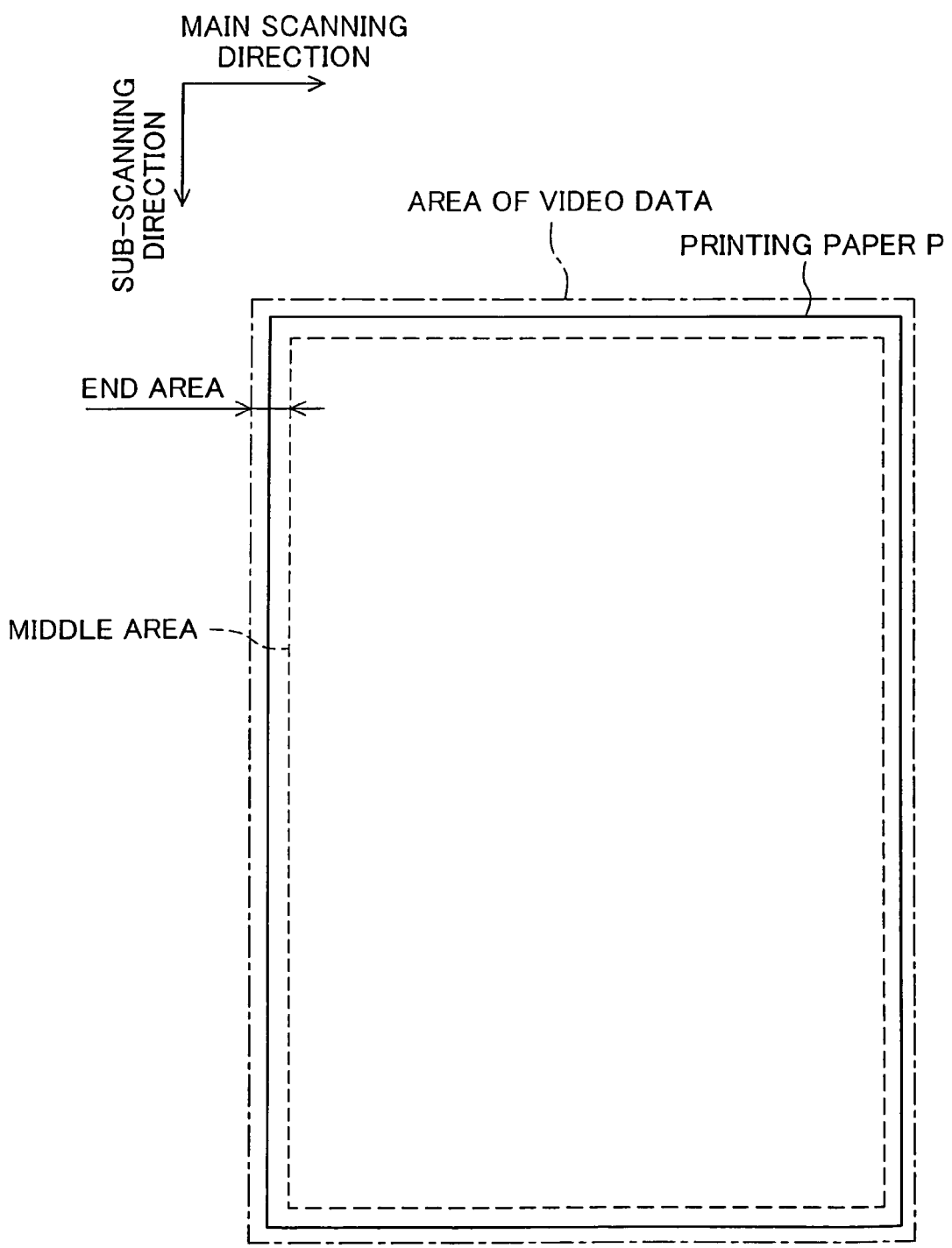
FIG. 9 is a plan view showing an area of resolution-converted video data relative to the area of printing paper P.

FIG. 9 is a plan view showing an area of resolution-converted video data relative to the area of the printing paper P. As clearly understood from FIG. 9, the area of the video data is wider than the area of the printing paper P. The medium-size ink droplets IPm can thus hit against the printing paper P up to their respective ends, irrespective of a potential sub-scan feed error of the printing paper P and a potential hitting error of the medium-size ink droplets IPm.

The area of the video data is restricted to prevent the medium-size ink droplets IPm, which fail to reach the printing paper P, from being flown outside the grooves, that is, the upstream groove 126f, the downstream groove 126r, and the side grooves 126s (see FIG. 3). Such restriction effectively prevents the medium-size ink droplets IPm from being hit against the platen frame 125 of the color printer 20.

The control procedure allows for ejection of the small-size ink droplets IPs only in a middle area, while restraining ejection of the small-size ink droplets IPs outside the middle area, so as to prevent the small-size ink droplets IPs from being hit against the platen frame 125. The middle area is set to prevent the small-size ink droplets IPs from being flown outside the area of the printing paper P, irrespective of the potential sub-scan feed error of the printing paper P and a potential hitting error of the small-size ink droplets IPs.

The middle area is specified, since the small-size ink droplets IPs reaching the outside of the printing paper P may be floated by speed reduction or may be repelled by the ink absorption members 127r, 127f, and 127s to be misted. The small-size ink droplets IPs are repelled by the ink absorption members 127r, 127f, and 127s, because the surface tension is a predominant factor of determining the physical behavior of the small-size ink droplets IPs.

In this embodiment, the middle area is defined to exclude an outside area of the printing paper P and a specified inside area of the printing paper P corresponding to a range of possible errors including the potential sub-scan feed error of the printing paper P and the potential hitting error of the ink droplets. On the assumption that there are no such potential errors, a whole inside area of the printing paper P may be set to the middle area. On the same assumption, a wider area extended slightly to outside the printing paper P may be set to the middle area.

At step S120, the color conversion module 98 refers to the color conversion table LUT and converts the RGB video data into multi-tone data of the multiple inks available in the color printer 20 (see FIG. 4) with regard to the respective pixels. The multi-tone data express tone values, for example, in a range of 256 tones and have an identical area with the area of the original video data.

At subsequent step S200, the tone-decreasing module 99 carries out a tone-decreasing process. The tone-decreasing process reduces the 256 tones of the multi-tone data to 4 tones expressible in each pixel by the color printer 20. In this embodiment, the 4 expressible tones are states of 'formation of no dot', 'formation of a small-size dot', 'formation of a medium-size dot', and 'formation of a large-size dot'.

Figure 10:
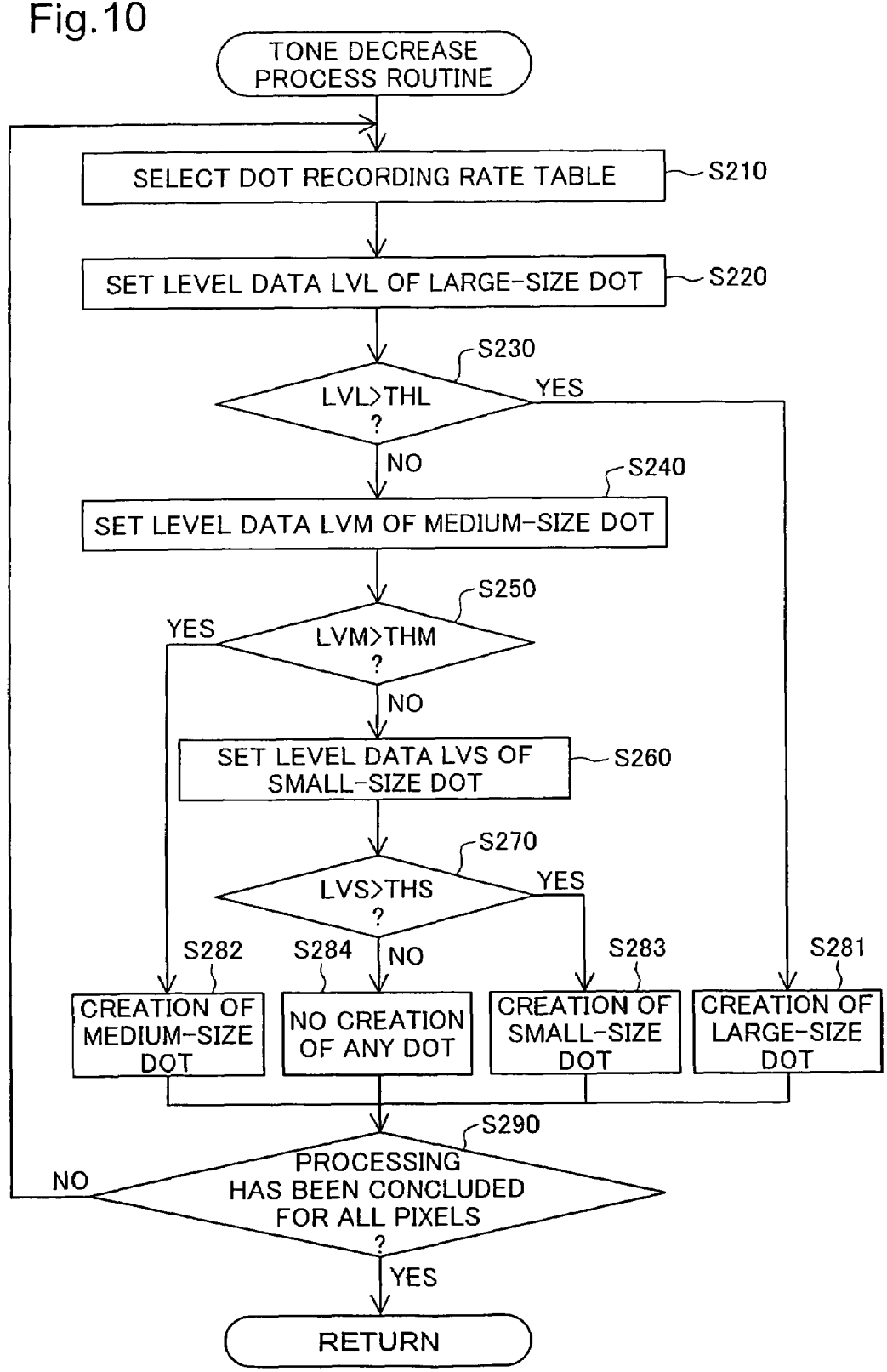
FIG. 10 is a flowchart showing the details of the tone-decreasing process executed in the first embodiment of the invention.

FIG. 10 is a flowchart showing the details of the tone-decreasing process executed in the first embodiment of the invention. At step S210, the tone-decreasing module 99 selects a dot recording rate table DT to be applied to the tone-decreasing process. The selection depends upon whether a target pixel of tone-decreasing belongs to the middle area (see FIG. 9) or an end area.

Figure 11A:
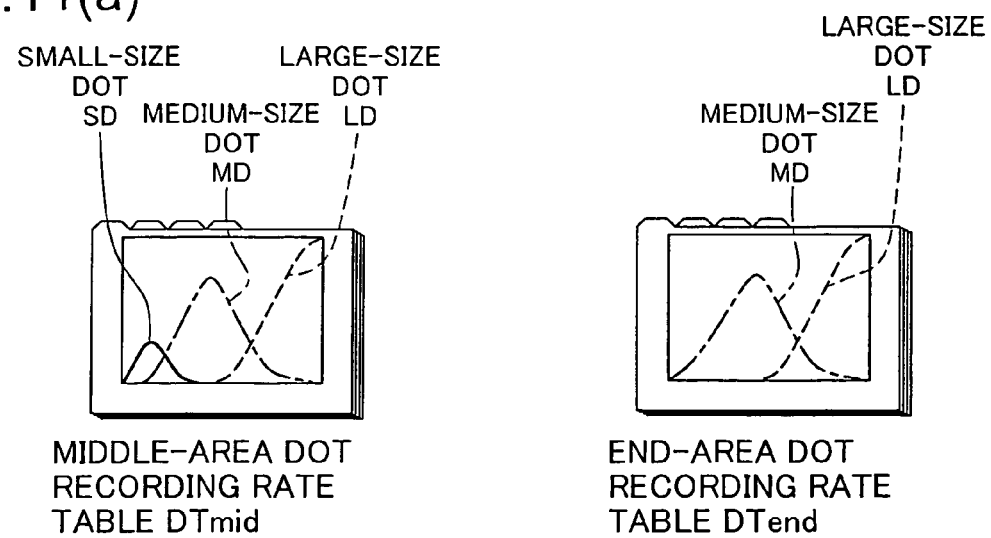
FIGS. 11(a) and 11(b) show dot recording rate tables used to determine level data of the three variable-size dots, that is, the large-size, medium-size, and small-size dots.
Figure 11B:
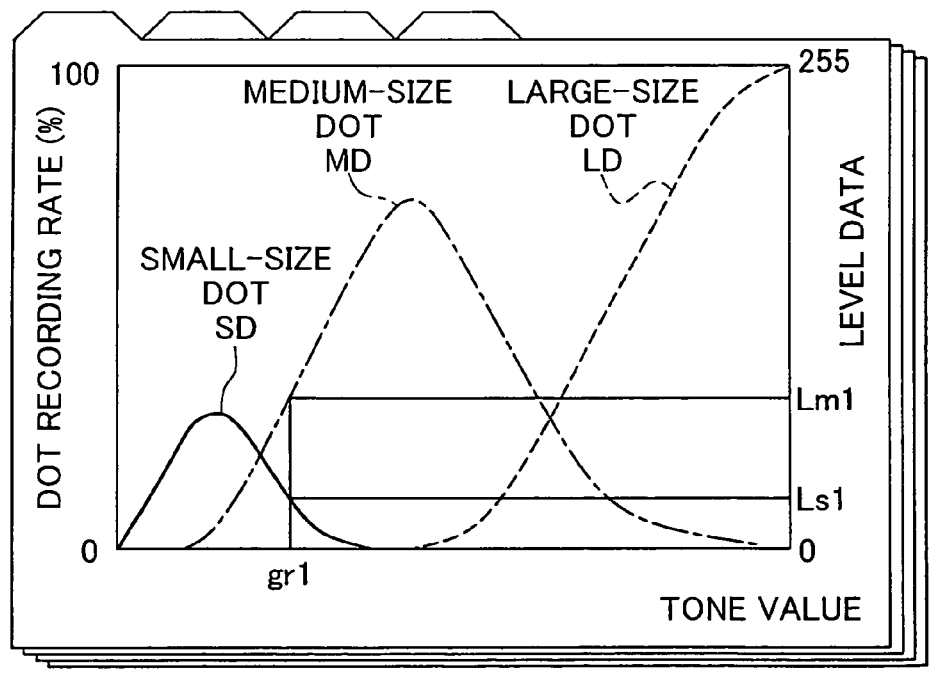

FIGS. 11(a) and 11(b) show dot recording rate tables used to determine level data of the three variable-size dots, that is, the large-size, medium-size, and small-size dots. FIG. 11(a) shows a middle-area dot recording rate table DTmid for the middle area of printing paper and an end-area dot recording rate table DTend for the end area of printing paper.

The middle-area dot recording rate table DTmid shown in FIG. 11(a) is configured to use the three variable-size dots, that is, the large-size, medium-size, and small-size dots, to express the tone values of multi-tone data. The end-area dot recording rate table DTend shown in FIG. 11(b) is configured to use only the two variable-size dots, that is, the large-size dot and the medium-size dot, to express the tone values of multi-tone data. The end-area dot recording rate table DTend replaces the small-size dot with the medium-size dot of a substantially equal ink quantity, in order to attain practically identical ink ejection quantities per unit area corresponding to each tone value.

FIG. 11(b) shows the details of the middle-area dot recording rate table DTmid, with the tone value (0 to 255) as the abscissa, the dot recording rate (%) as the left ordinate, and the level data (0 to 255) as the right ordinate. Here the terminology 'dot recording rate' represents a ratio of dot-on pixels to all the pixels in a homogeneous area reproduced according to a fixed tone value. Curves SD, MD, and LD in FIG. 11(b) respectively denote a variation in dot recording rate of the small-size dot, a variation in dot recording rate of the medium-size dot, and a variation in dot recording rate of the large-size dot.

At step S220, the tone-decreasing module 99 sets level data LVL of the large-size dot. The terminology 'level data' represents data of 256 levels in a range of 0 to 255 converted from the dot recording rate. Level data LVL, LVM, and LVS respectively represent data converted from the dot recording rate of the large-size dot, the dot recording, rate of the medium-size dot, and the dot recording rate of the small-size dot. In the illustrated example of FIG. 11(b), the curves LD, MD, and SD respectively give the large-size dot level data LVL equal to 0, the medium-size dot level data LVM equal to Lm1, and the small-size dot level data LVS equal to Ls1 against a tone value gr1 of the multi-tone data.

At step S230, the tone-decreasing module 99 compares the setting of the level data LVL with a preset threshold value THL to determine the dot formation in each pixel according to, for example, the systematic dither method. A dither matrix used in the systematic dither method has different settings of the threshold value THL to individual pixels in a pixel group. The procedure of this embodiment uses a dither matrix having settings in a range of 0 to 254 corresponding to a 16×16 square pixel block.

Figure 12:
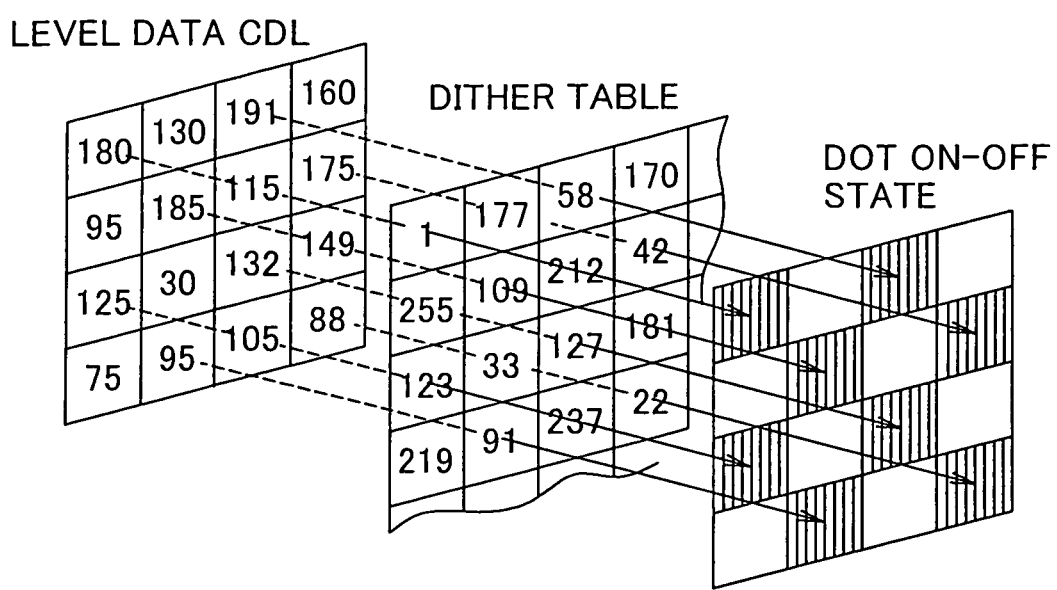
FIG. 12 shows the principle of specifying the dot formation according to the systematic dither method.

FIG. 12 shows the principle of specifying the dot formation according to the systematic dither method. For convenience of illustration, data with regard to only part of the pixels are shown in FIG. 12. The level data LVL of the respective pixels are compared with corresponding values in a dither table. A dot is to be formed when the level data LVL is greater than the corresponding threshold value THL in the dither table. No dot is to be formed, on the other hand, when the level data LVL is smaller than the threshold value THL. Hatched squares in FIG. 12 denote dot-on pixels.

When the level data LVL is greater than the threshold value THL at step S230, the routine specifies formation of a large-size dot (step S281). When the level data LVL is smaller than the threshold value THL at step S230, on the other hand, the routine specifies no formation of the large-size dot and goes to step S240.

At step S240, the tone-decreasing module 99 sets the level data LVM of the medium-size dot in the same manner as the level data LVL of the large-size dot. When the level data LVM of the medium-size dot is greater than a preset threshold value THM at step S250, the routine specifies formation of a medium-size dot (step S282). When the level data LVM is smaller than the threshold value THM at step S250, on the other hand, the routine specifies no formation of the medium-size dot and goes to step S260.

At step S260, the tone-decreasing module 99 sets the level data LVS of the small-size dot in the same manner as the level data LVL of the large-size dot and the level data LVM of the medium-size dot. When the level data LVS is greater than a preset threshold value THS at step S270, the routine specifies formation of a small-size dot (step S283). When the level data LVS is smaller than the threshold value THS at step S270, on the other hand, the routine specifies no formation of any dot (step S284).

When the above series of processing has been concluded for all the pixels (step S290), the routine goes to step S300 (FIG. 8).

At step S300, the print data generation module 100 rearranges the dot data representing the dot formation of the respective pixels in an order of data to be transferred to the color printer 20 and outputs the rearranged dot data as final print data PD. The print data PD include raster data representing the dot recording state of each main scan and data representing sub-scan feeds.

The procedure of the first embodiment uses only the medium-size dot and the large-size dot to express the tones in the pixels belonging to the end area. This arrangement effectively prevents adhesion of misted ink droplets for formation of small-size dots onto the color printer 20.

C. Print Data Generation Process in Second Embodiment

Figure 13:
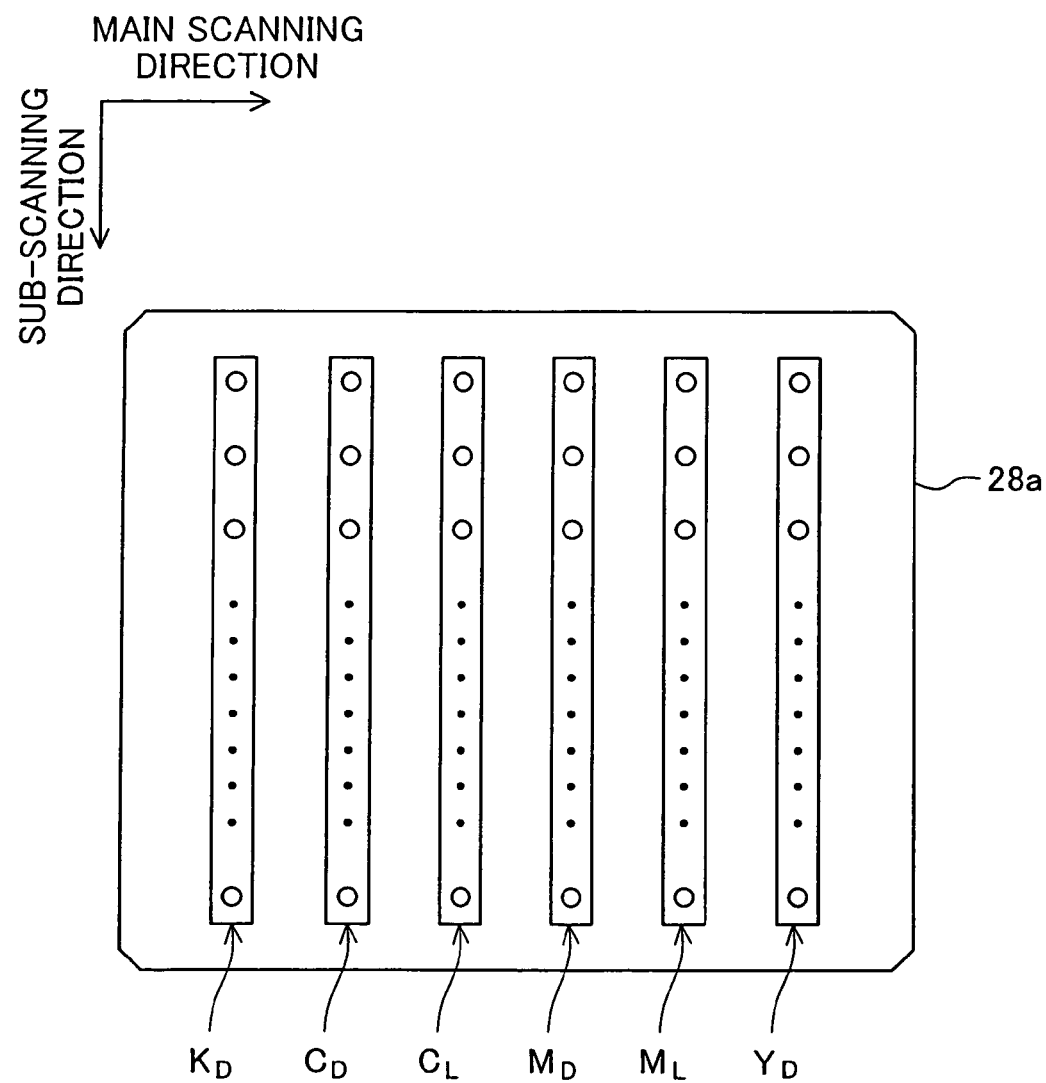
FIG. 13 shows an arrangement of nozzles on a bottom face of a print head 28a in a second embodiment of the invention.

FIG. 13 shows an arrangement of nozzles on a bottom face of a print head 28a in a second embodiment of the invention. The primary difference from the first embodiment is that the second embodiment forms two different-density dots, that is, a dark dot and a light dot, with regard to cyan and magenta for printing.

The bottom face of the print head 28a has a black ink nozzle array KD for ejection of black ink, a dark cyan ink nozzle array CD for ejection of dark cyan ink, a light cyan ink nozzle array CL for ejection of light cyan ink, a dark magenta ink nozzle array MD for ejection of dark magenta ink, a light magenta ink nozzle array ML for ejection of light magenta ink, and a yellow ink nozzle array YD for ejection of yellow ink.

The first capital letter in the symbol representing each nozzle array represents the color of ink. The subscript 'D' shows ink having a relatively high density, while the subscript 'L' shows ink having a relatively low density.

Figure 14A:
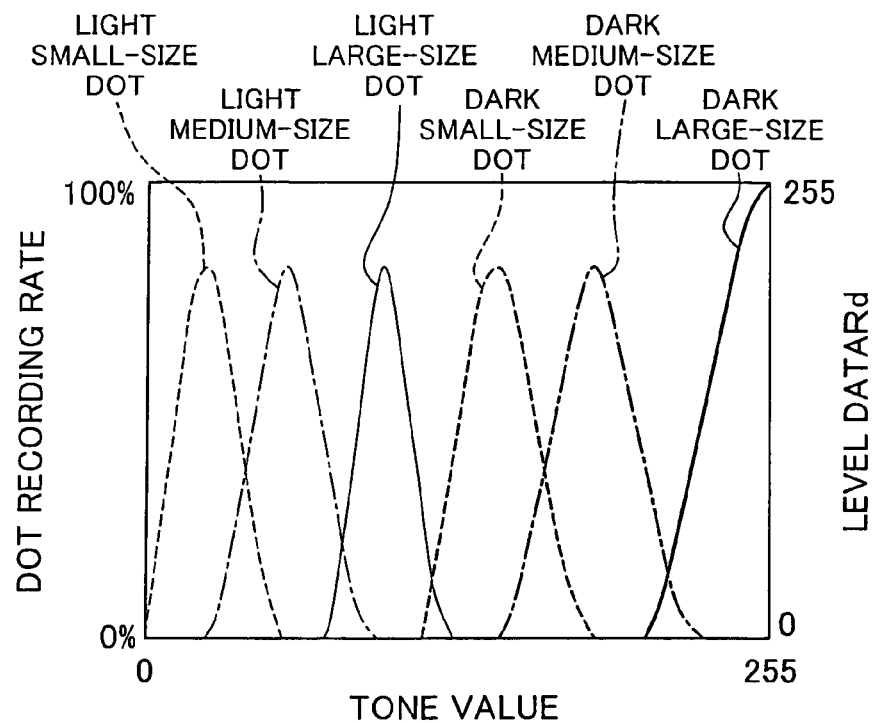
FIGS. 14(a) and 14(b) show dot recording rate tables with regard to three variable-size and two different-density dots, that is, dark and light large-size, medium-size, and small-size dots.
Figure 14B:
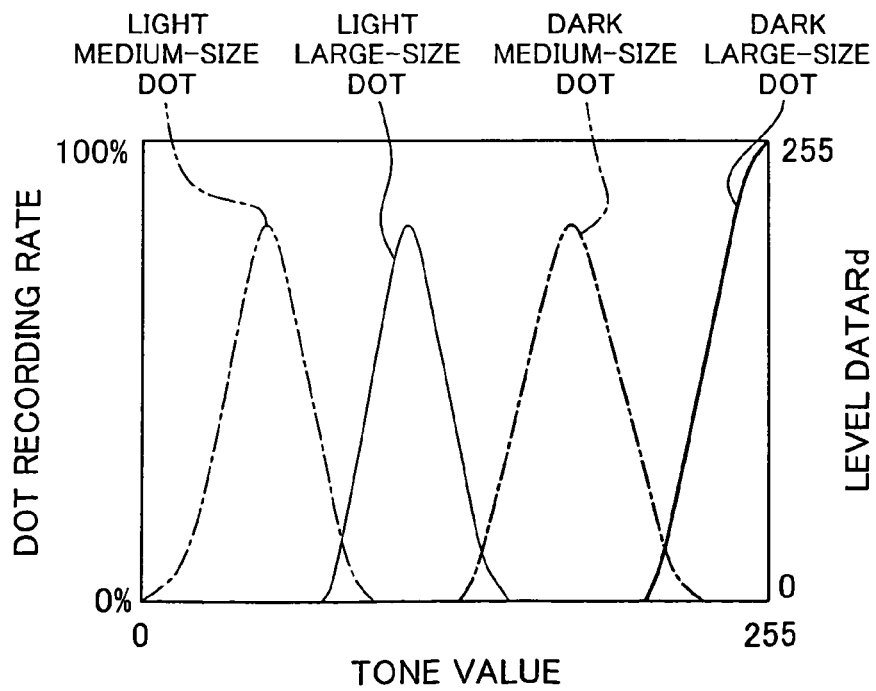

FIGS. 14(a) and 14(b) show dot recording rate tables with regard to three variable-size and two different-density dots, that is, dark and light large-size, medium-size, and small-size dots. FIG. 14(a) shows a middle-area dot recording rate table, and FIG. 14(b) shows an end-area dot recording rate table.

In this illustrated example, three variable-size dots, that is, large-size, medium-size, and small-size dots, are recorded with two different-density inks, that is, dark ink and light ink. The dot recording rate table accordingly shows variations of dot recording rates of the dark and light large-size, medium-size, and small-size dots against the tone value. In this embodiment, the end-area dot recording rate table replaces the small-size dot with another-size dot of a substantially equal ink quantity to reproduce the substantially equivalent color, in order to attain practically identical ink ejection quantities per unit area corresponding to each tone value. In this example, the light small-size dot is replaced by the light medium-size dot, and the dark small-size dot is replaced by the light large-size dot and the dark medium-size dot.

As described above, the technique of the invention is applicable to formation of dots with two or more different-density inks.

D. Print Data Generation Process in Third Embodiment

FIGS. 15(a) and 15(b) are a plan view and a graph showing an area of video data relative to the area of printing paper P in a third embodiment of the invention. The difference from the previous embodiments is that the video data has a transition area between an end area and a middle area. The transition area is provided to restrain potential deterioration of the picture quality due to an abrupt change of the dot pattern between the end area with no recording of the small-size dot and the middle area with recording of the small-size dot.

As clearly shown in FIG. 15(b), the transition area is set to increase a maximum dot recording rate of the small-size dot from the vicinity of the end area toward the vicinity of the middle area. The transition area is divided into four divisional areas, to which four dot recording rate tables having different dot recording rates of the small-size dot are respectively applied.

For example, a dot recording rate table with a smallest setting SM4 to the maximum dot recording rate of the small-size dot is applied to a division of the transition area adjoining to the end area. A dot recording rate table with a largest setting SM2 to the maximum dot recording rate of the small-size dot is applied to a division of the transition area adjoining to the middle area. A dot recording rate table with an intermediate setting to attain a gentle variation is applied to a middle division of the transition area. Such settings effectively prevent the occurrence of any false contour and potential deterioration of the picture quality due to an abrupt change in distribution of the large-size, medium-size, and small-size dots.

Figure 16:
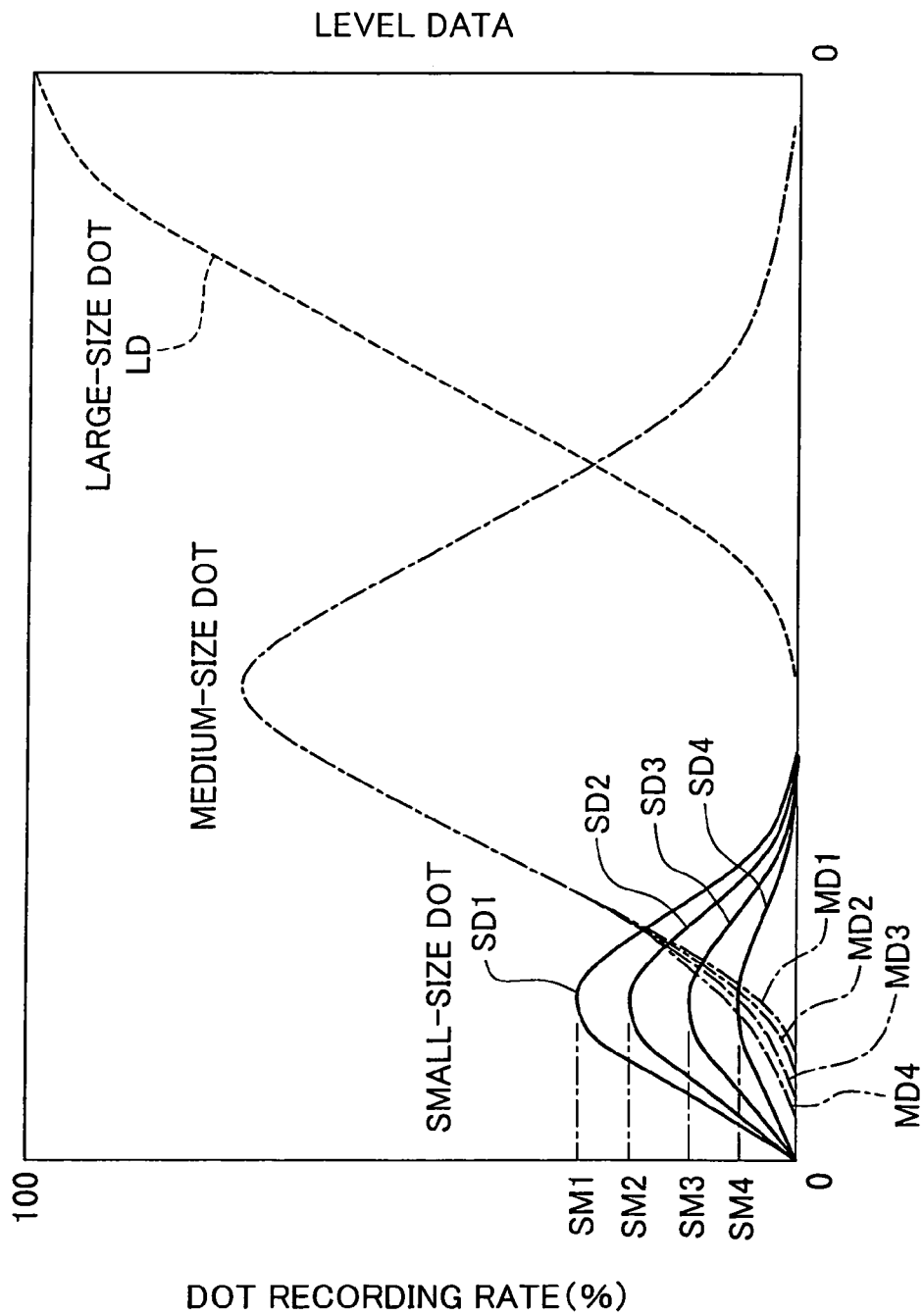
FIG. 16 is a graph simultaneously showing four dot recording rate tables used to determine level data of the three variable-size dots, that is, the large-size, medium-size, and small-size dots, in a transition area.

FIG. 16 is a graph simultaneously showing four dot recording rate tables DTtrn used to determine level data of the three variable-size dots, that is, the large-size, medium-size, and small-size dots, in the transition area. Curves SD4 and MD4 are used to show a variation in dot recording rate of the small-size dot and a variation in dot recording rate of the medium-size dot in the division of the transition area adjoining to the end area.

In the structure of the third embodiment, the transition area is set between the end area and the middle area to increase the maximum dot recording rate of the small-size dot from the vicinity of the end area toward the vicinity of the middle area. This arrangement advantageously prevents potential deterioration of the picture quality due to an abrupt change of the dot pattern between the end area and the middle area.

In this embodiment, the transition area is set in part of the middle area of the first embodiment. The transition area may be set to cross over the border between the middle area and the end area, or may alternatively be set in part of the end area of the first embodiment.

E. Print Data Generation Process in Fourth Embodiment

Figure 17A:
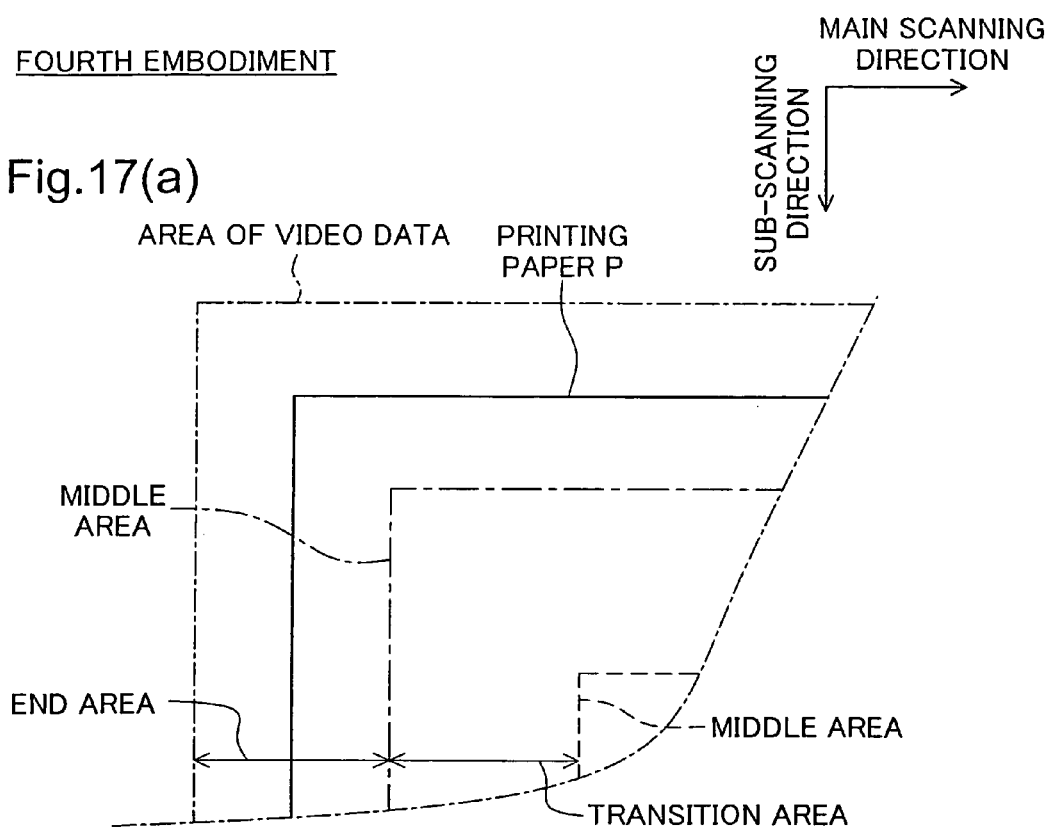
FIGS. 17(a) and 17(b) are a plan view and a graph showing an area of video data relative to the area of printing paper P in a fourth embodiment of the invention.
Figure 17B:
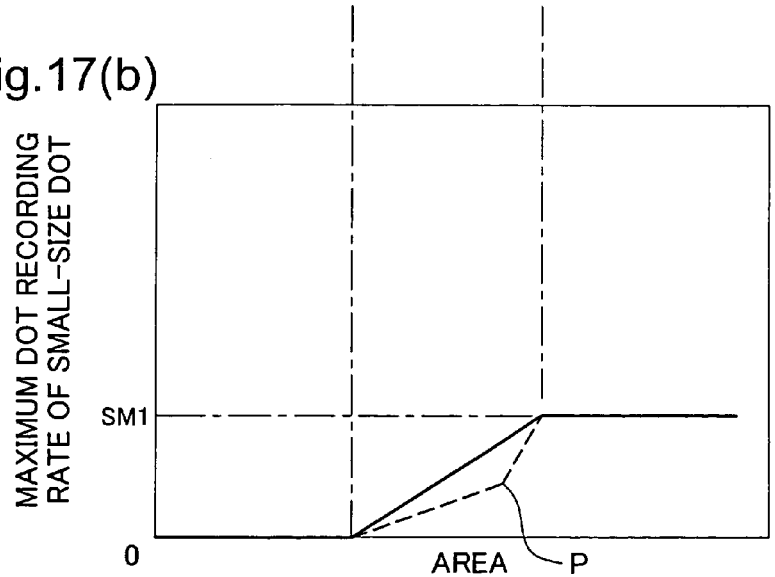

FIGS. 17(a) and 17(b) are a plan view and a graph showing an area of video data relative to the area of printing paper P in a fourth embodiment of the invention. The video data of this embodiment has a transition area like the third embodiment, but a different method from that of the third embodiment is applied to determine the dot recording rate in the transition area.

The procedure of the third embodiment applies the transition-area dot recording rate tables having intermediate characteristics between those of the end-area dot recording rate table and the middle-area dot recording rate table to the transition area. The procedure of the fourth embodiment, on the other hand, carries out a linear interpolation with the end-area dot recording rate table and the middle-area dot recording rate table to determine the dot recording rate in the transition area, as shown by the solid line in FIG. 17(b). The linear interpolation determines the dot recording rate according to the distance from the position of each target pixel to be processed to the end area or to the middle area.

The dot recording rate in the transition area may thus be determined by the linear interpolation without using the transition-area dot recording rate tables.

The linear interpolation between the middle area and the end area may be replaced by a non-linear interpolation. One concrete procedure of the non-linear interpolation sets a dot recording rate table at a point P in the transition area as shown by the dotted line in FIG. 17(b) and implements stepwise linear interpolation with the dot recording rate table. The non-linear interpolation may otherwise use a non-linear mathematical formula.

The advantage of the linear interpolation (including stepwise linear interpolation) is the higher processing speed, whereas the advantage of the non-linear interpolation is the higher degree of freedom in the interpolating operation.

Figure 18:
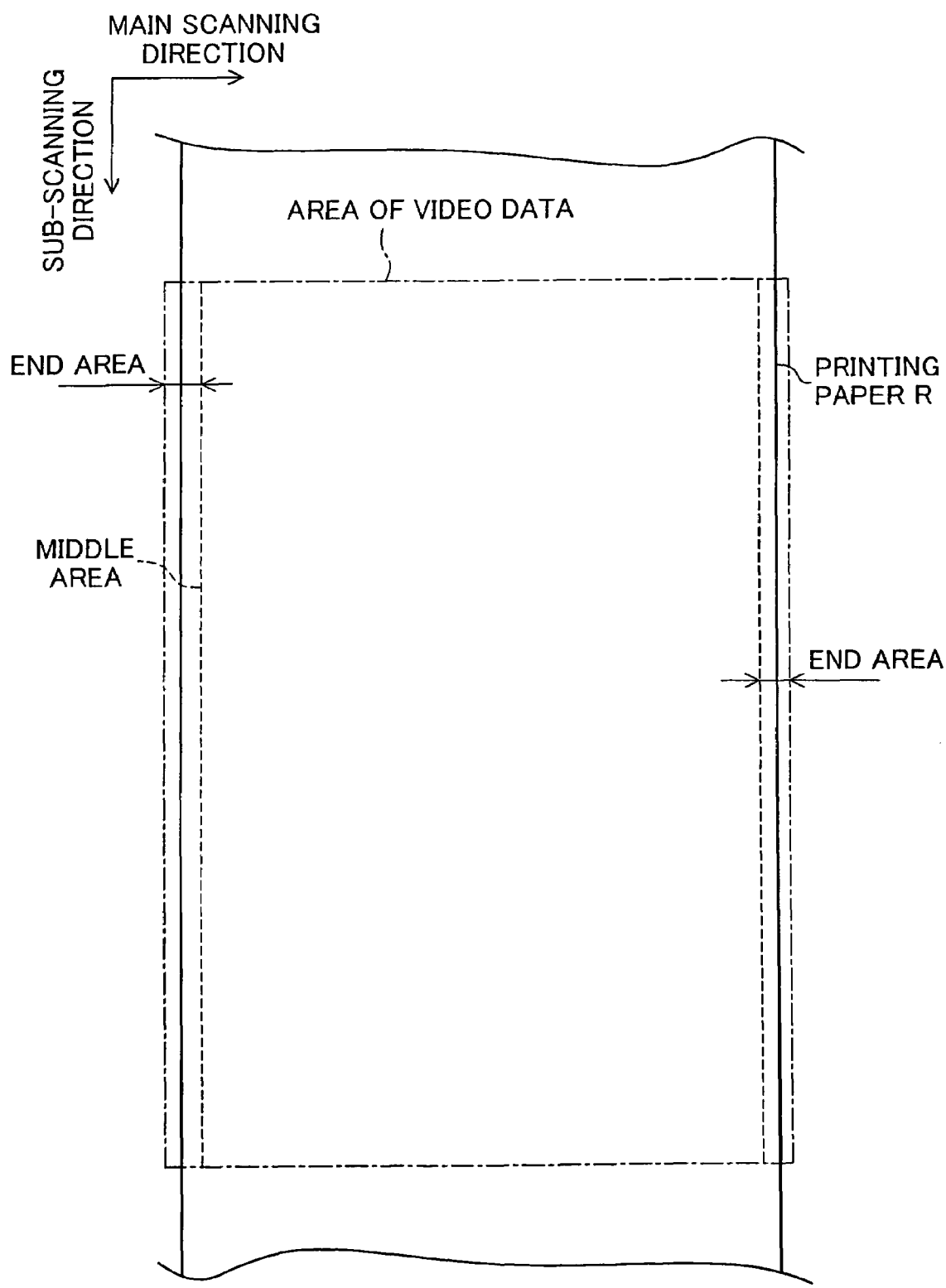
FIG. 18 is a plan view showing an area of video data relative to the area of roll paper R.

In any of the embodiments described above, the printing paper P as a rectangular cut sheet is used for the printing medium. The principle of the present invention is also applicable to printing on long roll paper extended in the sub-scanning direction. In the event of printing on the roll paper, it is desirable to set an end area and a transition area of the video data on only ends of the printing medium parallel to the sub-scanning direction, as shown in FIG. 18. In the case of printing multiple images on the roll paper, this arrangement desirably relieves the load of data processing in areas of the video data on the residual ends of the printing medium parallel to the main canning direction, while advantageously preventing potential deterioration of the picture quality due to a decrease in specific dot recording rate.

F. Print Data Generation Process in Fifth Embodiment

Figure 19:
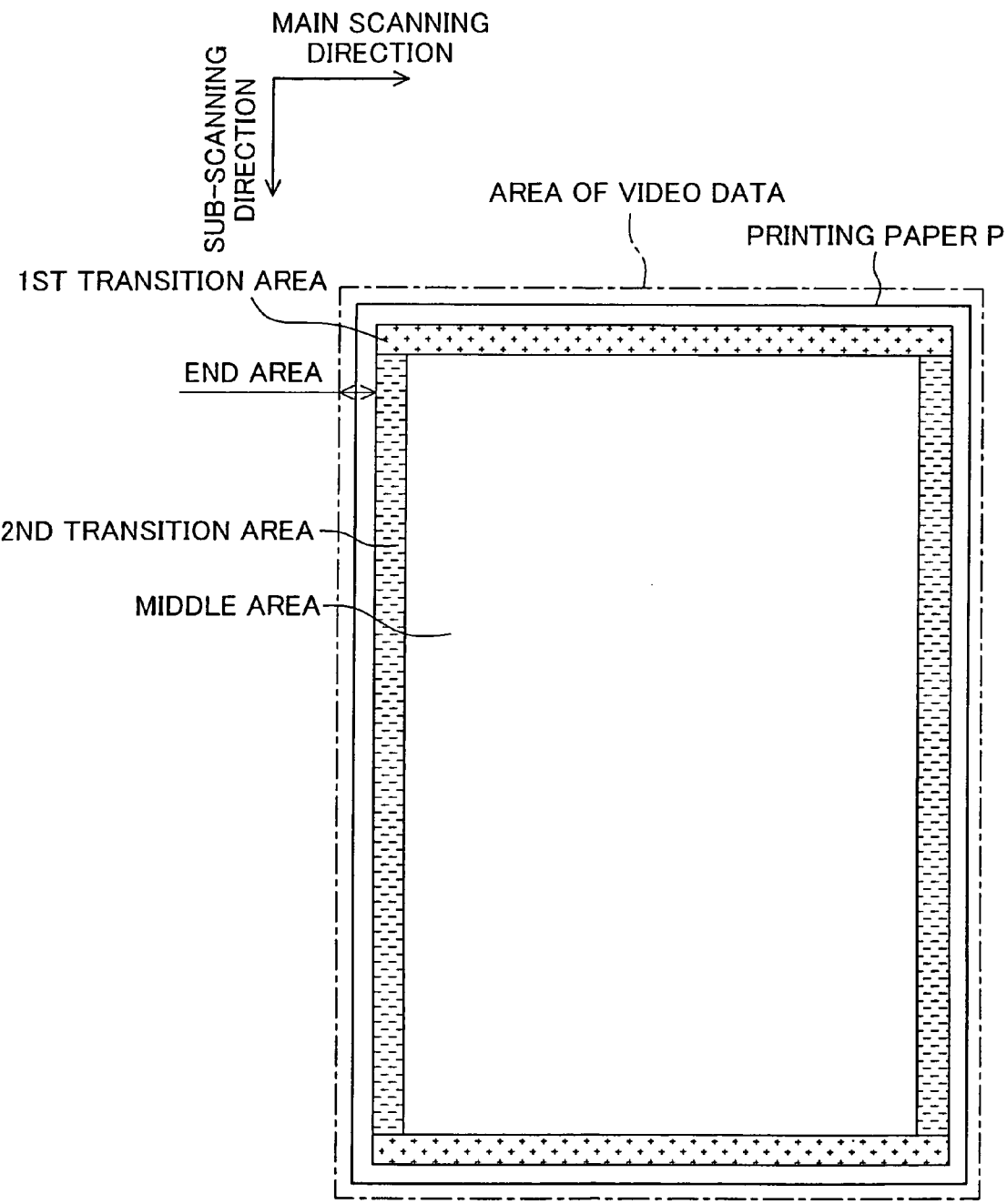
FIG. 19 is a plan view showing an area of resolution-converted video data relative to the area of printing paper P in a sixth embodiment of the invention.

FIG. 19 is a plan view showing an area of resolution-converted video data relative to the area of printing paper P in a sixth embodiment of the invention. The video data of the fifth embodiment is divided into an end area on an end of the printing medium, a middle area in a middle of the printing medium, and a transition area between the end area and the middle area. The transition area is divided into two first transition areas filled with the '+' symbol and two second transition areas filled with the '−' symbol. Here the first transition areas are extended in a direction parallel to the main scanning direction, and the second transition areas are residual areas.

FIGS. 20(a) and 20(b) show a process of tone-decreasing in the first transition areas in the fifth embodiment of the invention. FIG. 20(a) is an enlarged view showing an upper left end portion of the area of the resolution-converted video data (FIG. 19). FIG. 20(b) is a graph showing a variation in maximum dot recording rate of the small-size dot in the first transition area. The first transition area represents an area that is extended in the direction parallel to the main scanning direction and consists of raster lines (main scanning lines), each of which is subjected to tone-decreasing with an identical dot recording rate table.

The first transition area is set to increase the maximum dot recording rate of the small-size dot from the vicinity of the end area toward the vicinity of the middle area, as clearly shown in FIG. 20(b). Like the third embodiment, the first transition area is further divided into four divisional areas, to which the four dot recording rate tables DTtrn (see FIG. 16) having the four different dot recording rates of the small-size dot are applied.

Figure 21:
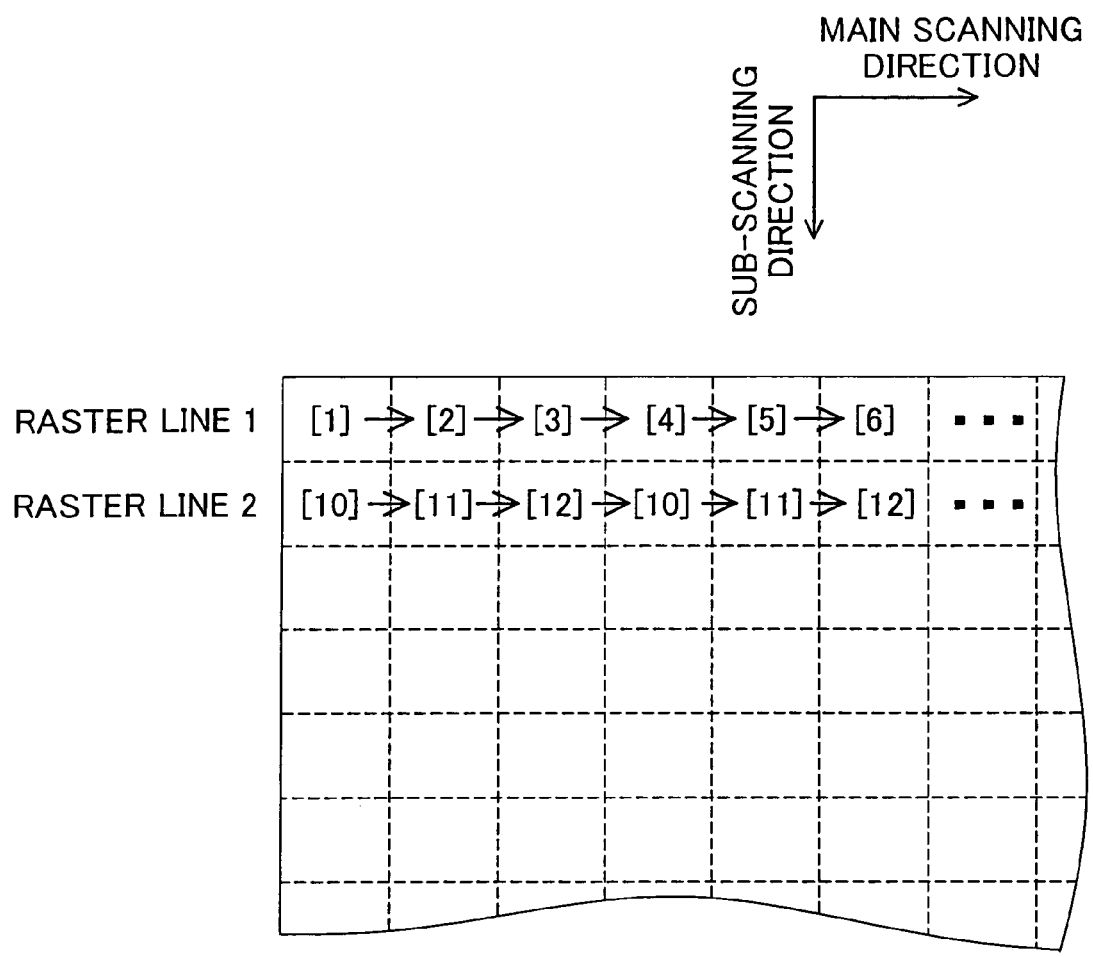
FIG. 21 shows an order of target pixels as the object of tone-decreasing in the fifth embodiment of the invention.

FIG. 21 shows an order of target pixels as the object of tone-decreasing in the fifth embodiment of the invention. The illustrated pixels are those in an upper left end portion of the first transition area, where each rectangle of the dotted line denotes a pixel and the figure in each pixel shows an ordinal number representing the order of tone-decreasing. Raster line 1 is a top most main scanning line in the first transition area, and Raster line 2 is a main scanning line adjoining to Raster line 1.

The procedure of this embodiment carries out tone-decreasing of the pixels included in the first transition areas by each raster line (each main scanning line). The tone-decreasing of the pixels on each raster line is sequentially performed in the main scanning direction. The concrete procedure first carries out the tone-decreasing of the pixels on Raster line 1 sequentially in the main scanning direction, and on conclusion of the tone-decreasing for all the pixels included in Raster line 1, performs the tone-decreasing of the pixels on Raster line 2 sequentially in the main scanning direction.

Tone-decreasing of the pixels included in the first transition area follows the dot recording rate tables DTtrn for the first transition area (see FIG. 16). As clearly understood from the graphs of FIG. 20(b) and FIG. 16, all the pixels on each raster line are subjected to tone-decreasing with an identical dot recording rate table.

The procedure of this embodiment carries out tone-decreasing without a changeover of the selected dot recording rate table in the first transition area. This arrangement does not require any additional processing relating to a changeover of the selected dot recording rate table, for example, reading each newly selected dot recording rate table into a cache memory, and thereby ensures the high-speed tone-decreasing.

Figure 22A:
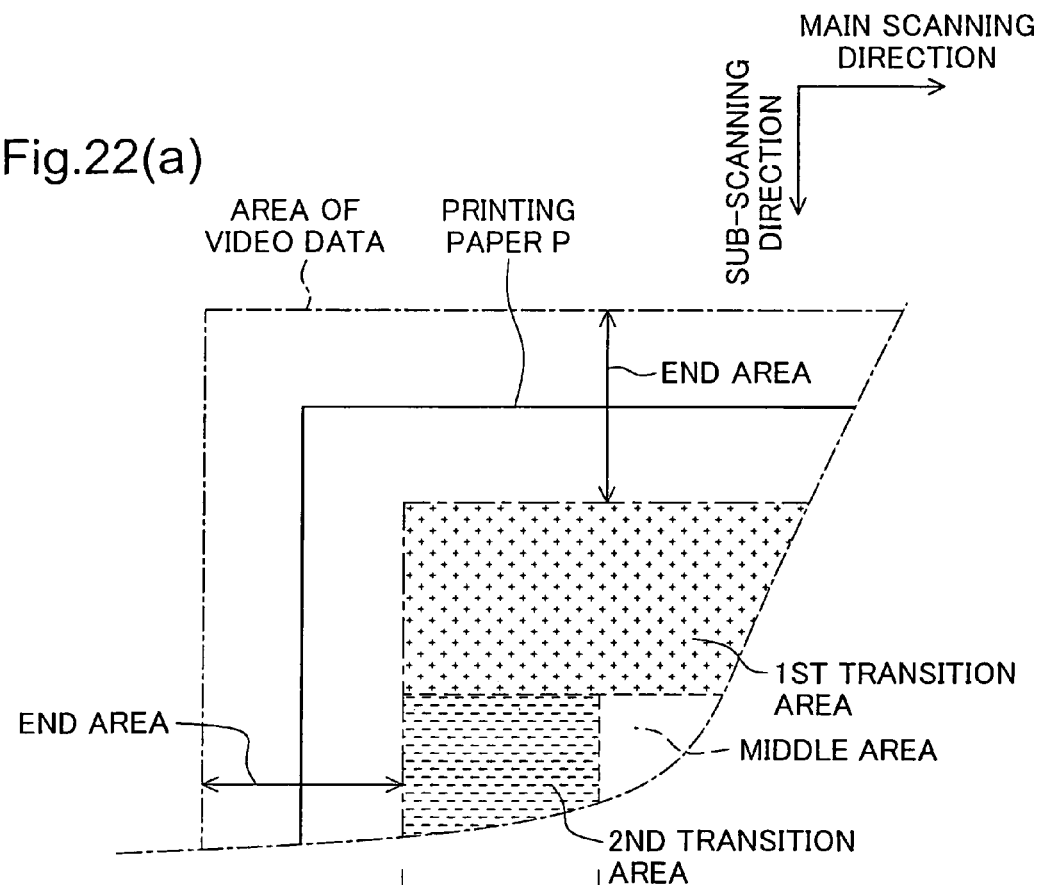
FIGS. 22(a) and 22(b) show a process of tone-decreasing in second transition areas in the fifth embodiment of the invention.
Figure 22B:
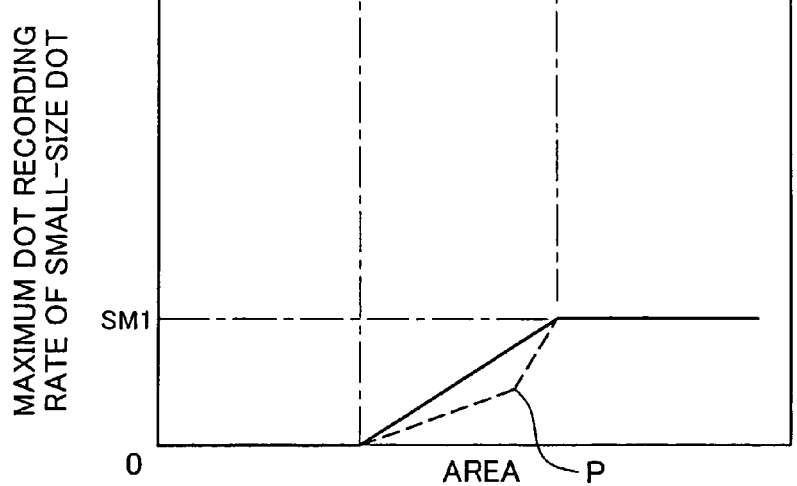

FIGS. 22(a) and 22(b) show a process of tone-decreasing in the second transition areas in the fifth embodiment of the invention. The second transition area is a residual area other than the first transition area parallel to the main scanning direction in the transition area set between the end area and the middle area.

A different method is applied to determine the dot recording rate in the second transition areas. Tone-decreasing in the first transition areas uses multiple transition-area dot recording rate tables having the intermediate characteristics between those of the end-area dot recording rate table and the middle-area dot recording rate table. Tone-decreasing in the second transition areas, on the other hand, carries out a linear interpolation with the end-area dot recording rate table and the middle-area dot recording rate table to determine the dot recording rate as shown by the solid line in FIG. 22(b). The linear interpolation determines the dot recording rate according to the distance from the position of each target pixel to be processed to the end area or to the middle area.

The linear interpolation is adopted for the tone-decreasing in the second transition areas, since tone-decreasing of the pixels on each raster line is not completed with only one dot recording rate table in the second transition areas, unlike the first transition areas. Namely the linear interpolation for the respective pixels belonging to the second transition areas has the higher total processing speed than the tone-decreasing with additional processing relating to a changeover of the selected dot recording rate table.

The procedure of this embodiment carries out the adequate tone-decreasing process for the characteristics of the respective areas, thus attaining high-speed generation of dot data with respect to the pixels belonging to the transition areas between the end area and the middle area. The processing in the main scanning direction discussed above may be replaced by the processing in the sub-scanning direction.

The linear interpolation adopted for the tone-decreasing in the second transition areas may be replaced by a non-linear interpolation. One concrete procedure of the non-linear interpolation sets a dot recording rate table at a point P in the transition area as shown by the dotted line in FIG. 22(b) and implements stepwise linear interpolation with the dot recording rate table. The non-linear interpolation may otherwise use a non-linear mathematical formula. This non-linear interpolation requires a changeover of the selected dot recording rate table only once.

The advantage of the linear interpolation (including stepwise linear interpolation) is the higher processing speed, whereas the advantage of the non-linear interpolation is the higher degree of freedom in the interpolating operation. Both the linear and non-linear interpolations are included in the terminology 'interpolation with the end-area dot recording rate table and the middle-area dot recording rate table' in the claims of the invention.

G. Print Data Generation Process in Sixth Embodiment

Figure 23:
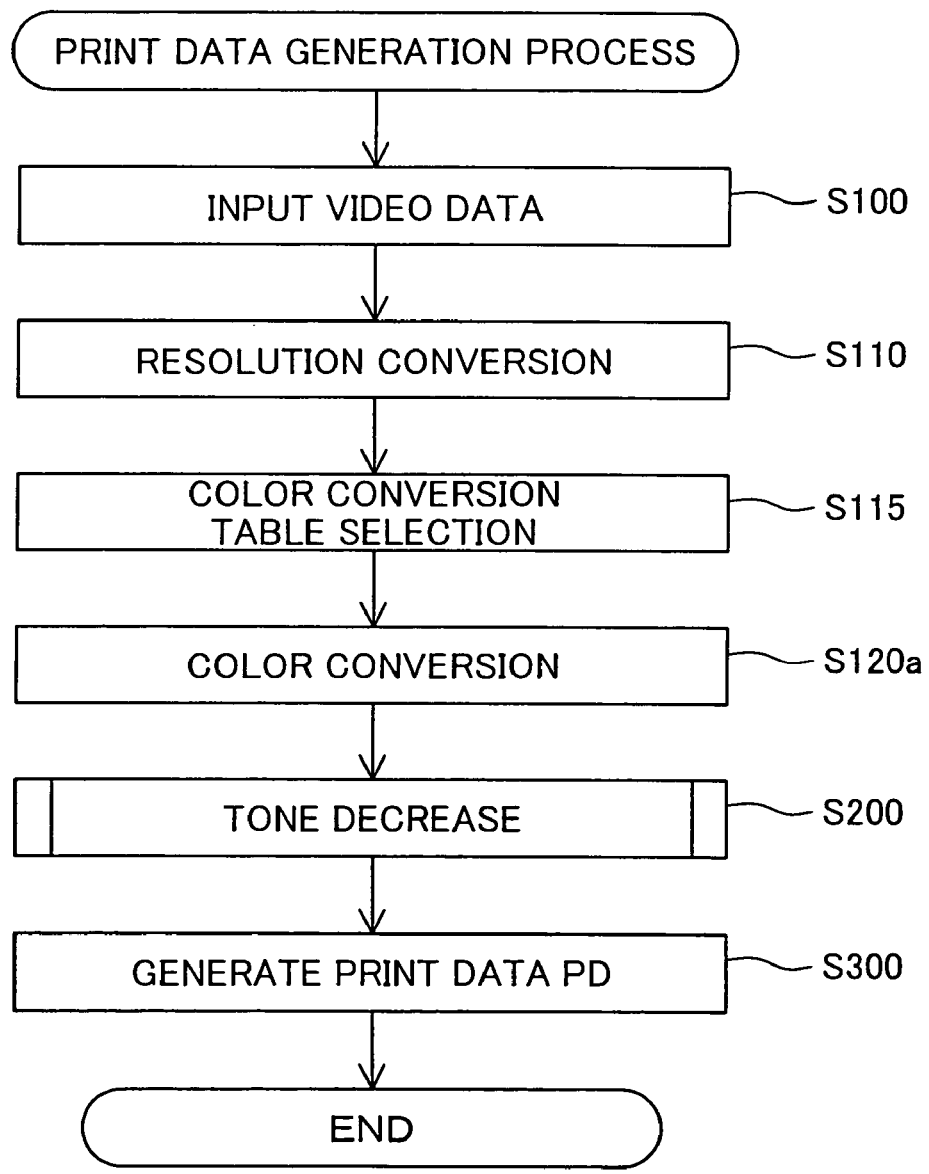
FIG. 23 is a flowchart showing a routine of print data generation process executed in a sixth embodiment of the invention.

FIG. 23 is a flowchart showing a routine of print data generation process executed in a sixth embodiment of the invention. The print data generation process of the sixth embodiment has the following differences from the print data generation process executed in each of the above embodiments:

(1) addition of a color conversion table selection process (step S115); and (2) a different procedure of tone-decreasing from the tone-decreasing (step S120 in FIG. 8) in each of the above embodiments.

The color conversion table selection process selects one among preset multiple color conversion tables corresponding to the area of each target pixel to be processed. The multiple color conversion tables include an end-area color conversion table LUTend and a middle-area color conversion table LUTmid.

Figure 24:
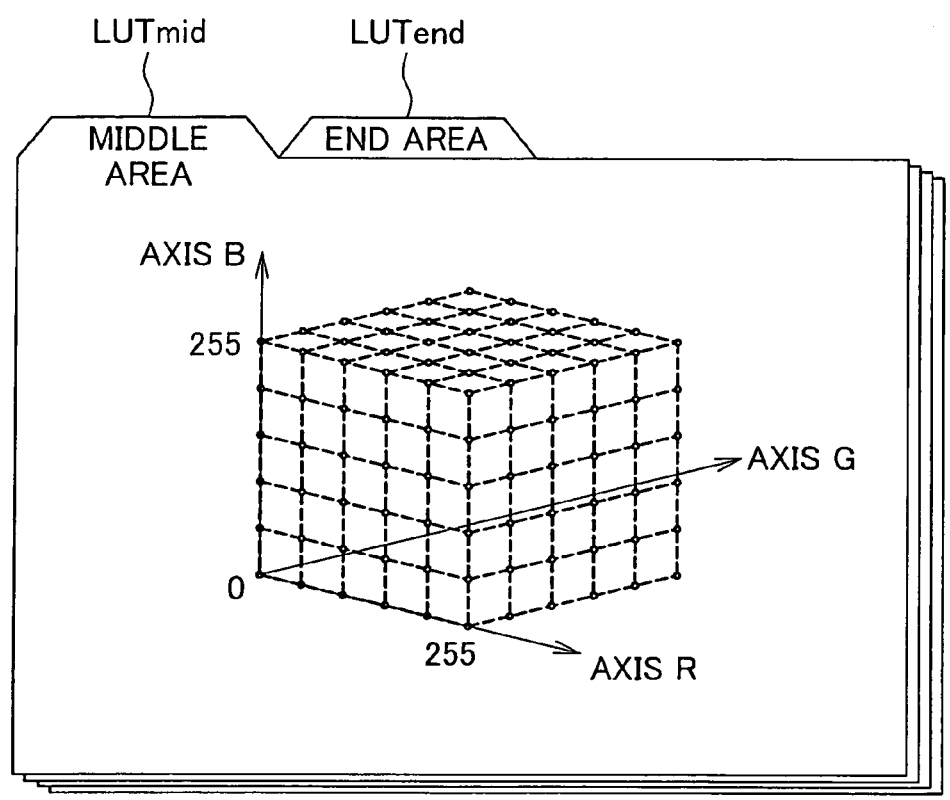
FIG. 24 shows a middle-area color conversion table LUTmid and an end-area color conversion table LUTend.

FIG. 24 shows the middle-area color conversion table LUTmid and the end-area color conversion table LUTend. The two color conversion tables LUTmid and LUTend store ejection quantities of respective inks with regard to each set of RGB tone values. The color conversion module 98 refers to these color conversion tables and specifies ejection quantities of colored inks and quality-enhancing ink corresponding to each set of R, G, and B tone values. The ejection quantity is expressed by the tone value of 256 levels, where the full level in each pixel filled with one of the ejected inks is 255. Namely each ink has a tone value in a range of 0 to 255.

Figure 25A:
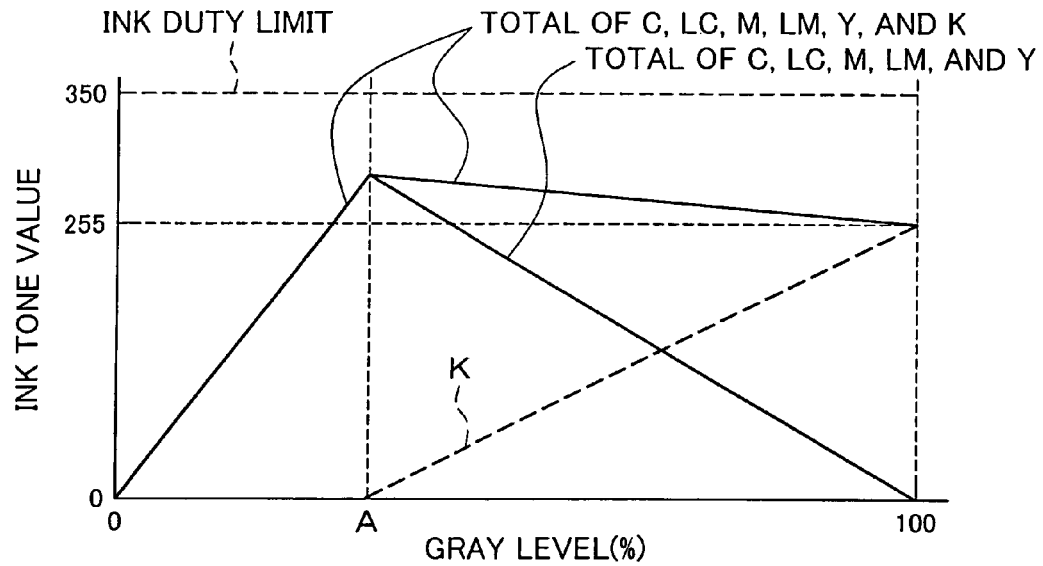
FIGS. 25(a) and 25(b) show variations in ink tone value against the gray level on a W hue axis in the multiple color conversion tables LUTmid and LUTend.
Figure 25B:
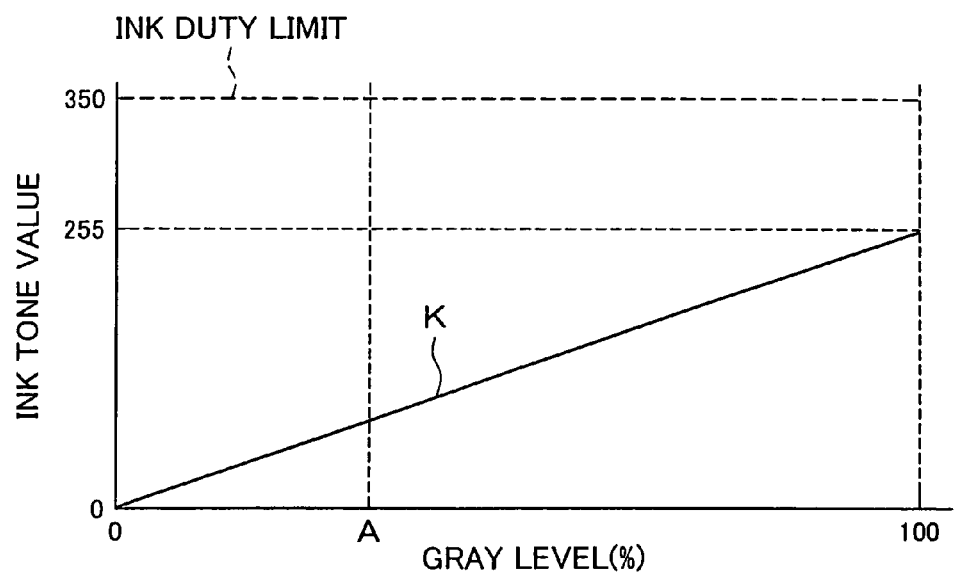

FIGS. 25(a) and 25(b) show variations in ink tone value against the gray level on a W hue axis in the multiple color conversion tables LUTmid and LUTend. The W hue axis represents achromatic color in the color conversion tables. FIG. 25(a) shows a variation in ink tone value against the gray level in the middle-area color conversion table LUTmid, and FIG. 25(b) shows a variation in ink tone value against the gray level in the end-area color conversion table LUTend.

As shown in the graph of FIG. 25(a), a total dot recording rate of C, LC, M, LM, and Y increases with an increase in gray level from 0% to A % in the middle-area color conversion table LUTmid. Dots are formed only with C, M, and Y inks in this area. Gray color is reproduced by only composite black in the area of low gray level. Such reproduction restricts potential deterioration of the picture quality due to the graininess of dots with black ink.

At the gray level exceeding A %, the C, LC, M, LM, and Y dots are gradually replaced by K dots. At the gray level of 100%, all the C, M, and Y dots are replaced by K dots and the total dot recording rate of C, M, and Y is equal to 0%. Gray color is reproduced by decreasing the rate of composite black and increasing black dots in the area of high gray level. This arrangement aims to prevent the potential quality-deteriorating phenomena like bronzing, due to an excess quantity of ink ejection per unit area.

As shown in the graph of FIG. 25(b), gray color is reproduced by only black ink with no use of composite black in the end-area color conversion table LUTend. Reduction of the total ink ejection quantity regardless of the gray level restricts potential ejection of ink outside the printing paper P.

It is, however, not essential to set the end-area color conversion table LUTend with no use of the color inks, cyan ink, magenta ink, and yellow ink. The end-area color conversion table LUTend is required to have the less settings of ejection quantities of cyan, magenta, and yellow ink than the settings of ejection quantities in the middle-area color conversion table LUTmid and to increase the ejection quantity of black ink and thereby compensate for a resulting color change.

Figure 26:
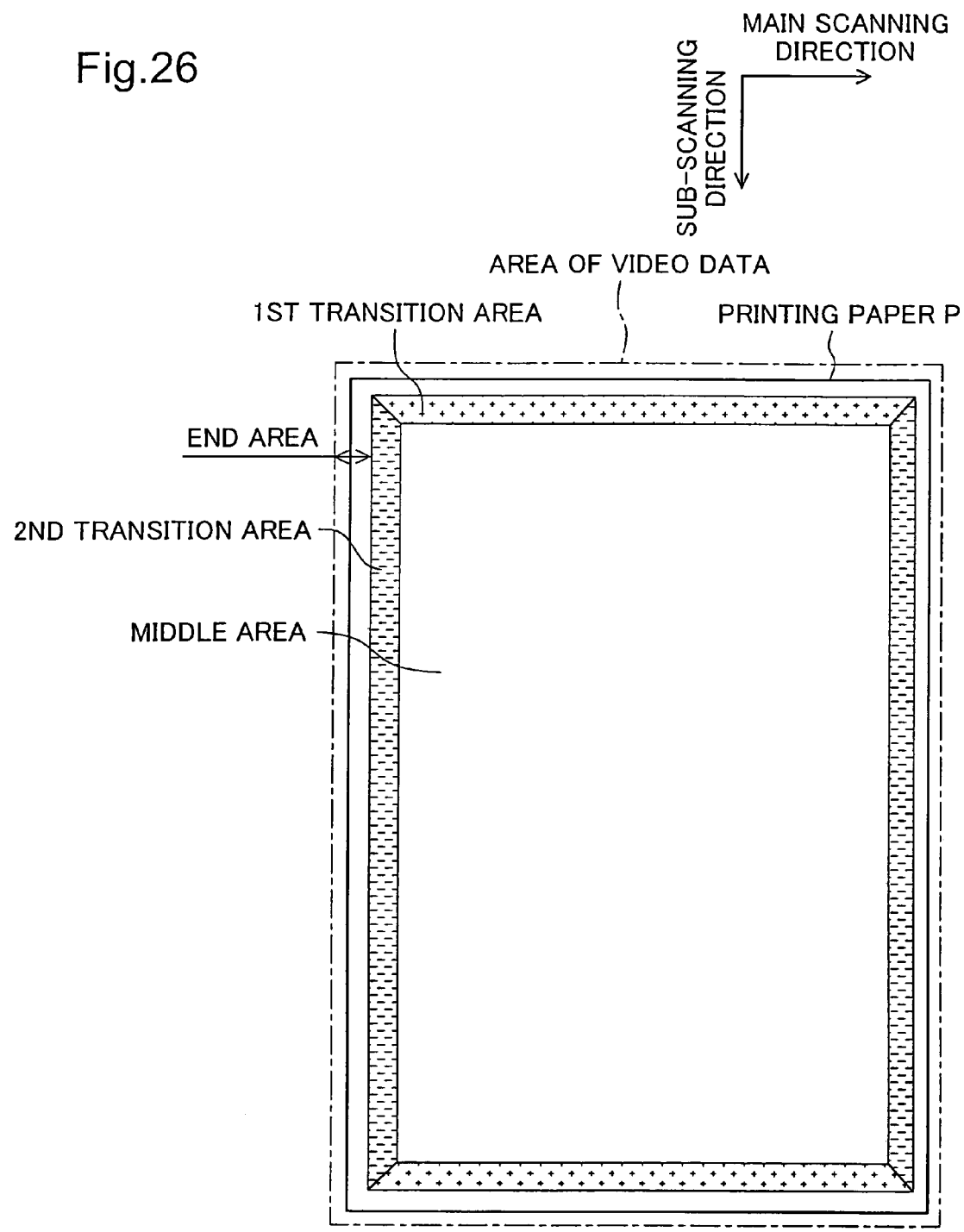
FIG. 26 is a plan view showing an area of resolution-converted video data relative to the area of printing paper P in the sixth embodiment of the invention.

FIG. 26 is a plan view showing an area of resolution-converted video data relative to the area of printing paper P in the sixth embodiment of the invention. The area of video data has different boundaries between first transition areas and second transition areas from those of FIG. 19.

Figure 27A:
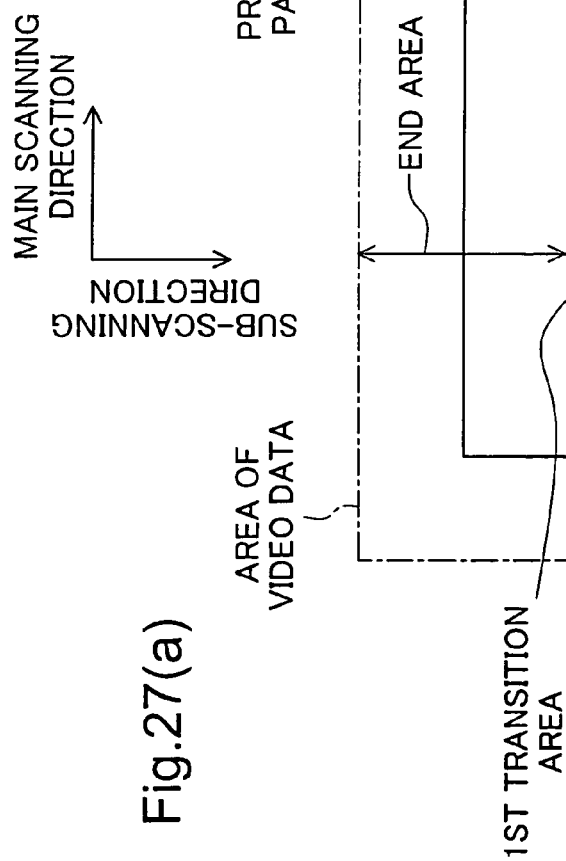
FIGS. 27(a) and 27(b) show a process of tone-decreasing in first transition areas in the sixth embodiment of the invention.
Figure 27B:
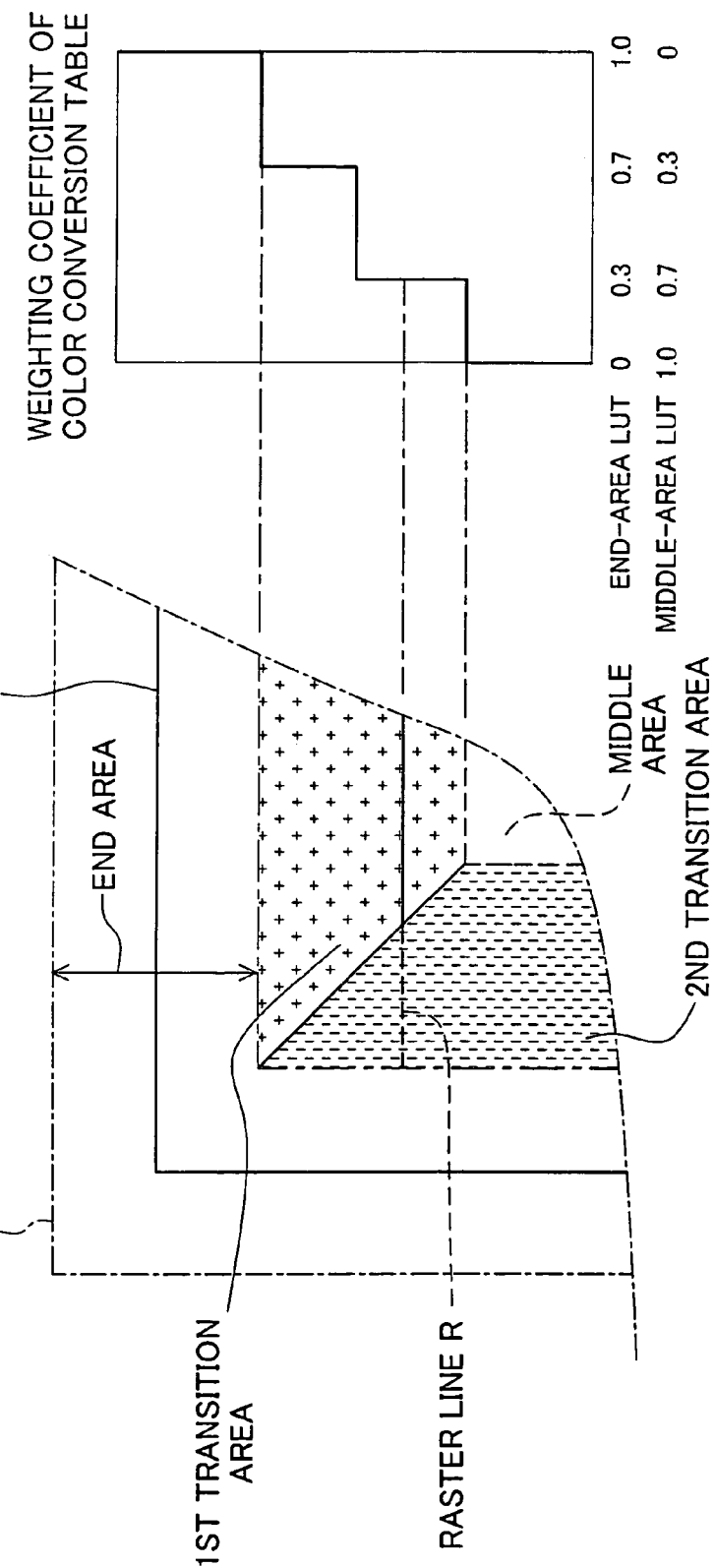

FIGS. 27(a) and 27(b) show a process of tone-decreasing in the first transition areas in the sixth embodiment of the invention. FIG. 27(a) is an enlarged view showing an upper left end portion of the area of the resolution-converted video data (FIG. 19). FIG. 27(b) is a graph showing a variation in weighting coefficient used for preparation of a color conversion table applied to the first transition areas as a combination of the two color conversion tables LUTend and LUTmid.

The color conversion table applied to, for example, a raster line R (shown by the solid line) in the first transition area is prepared by the steps of:

(1) multiplying the ejection quantities of the respective inks corresponding to each set of R, G, and B tone values stored in the end-area color conversion table LUTend by a weighting coefficient of 0.3;

(2) multiplying the ejection quantities of the respective inks corresponding to each set of R, G, and B tone values stored in the middle-area color conversion table LUTmid by a weighting coefficient of 0.7; and (3) summing up the two products and storing the sums as the ejection quantities of the respective inks corresponding to each set of R, G, and B tone values.

One preferable procedure prepares such a color conversion table, for example, at the time of installation of the printer driver 96 (see FIG. 1) and stores the color conversion table in the hard disk (not shown).

Figure 28:
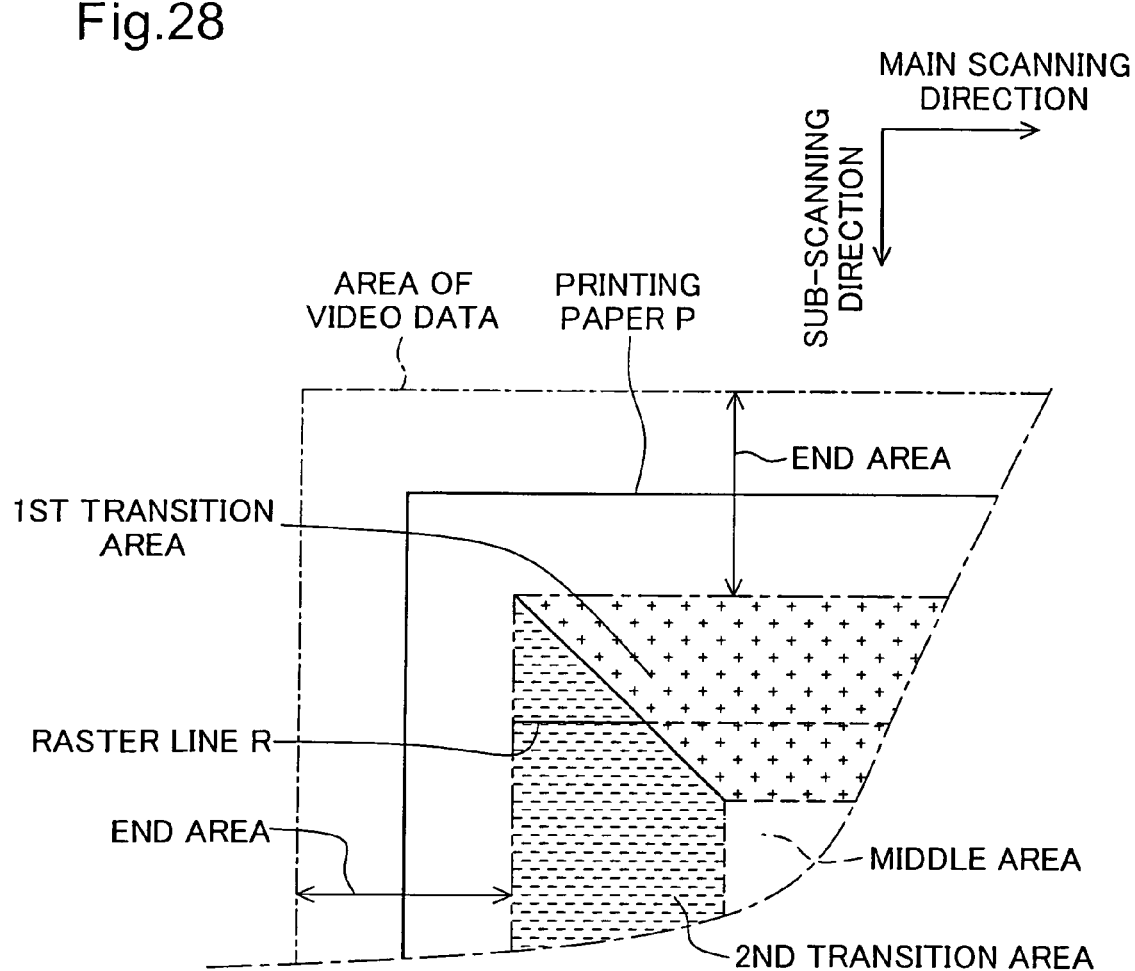
FIG. 28 shows a process of tone-decreasing in second transition areas in the sixth embodiment of the invention.

FIG. 28 shows a process of tone-decreasing in the second transition areas in the sixth embodiment of the invention. Color conversion is carried out, for example, for a raster line R (expressed by the solid line) in the first transition area by the steps of:

(1) reading the ejection quantities of the respective inks corresponding to each set of R, G, and B tone values stored in the end-area color conversion table LUTend;

(2) reading the ejection quantities of the respective inks corresponding to each set of R, G, and B tone values stored in the color conversion table applied to the raster line R (expressed by the dotted line) in the first transition area; and (3) carrying out a linear interpolation with the two read-out ink ejection quantities according to the distances from the end area and the middle area.

The tone-decreasing process in this embodiment has a decreasing slope of the ink ejection quantity in the transition area from the vicinity of the middle area toward the vicinity of the end area. This arrangement desirably prevents potential deterioration of the picture quality in the vicinity of the ends of a printing medium in the process of printing to the ends of the printing medium with plurality of different inks.

H. Print Data Generation Process in Seventh Embodiment

Figure 29:
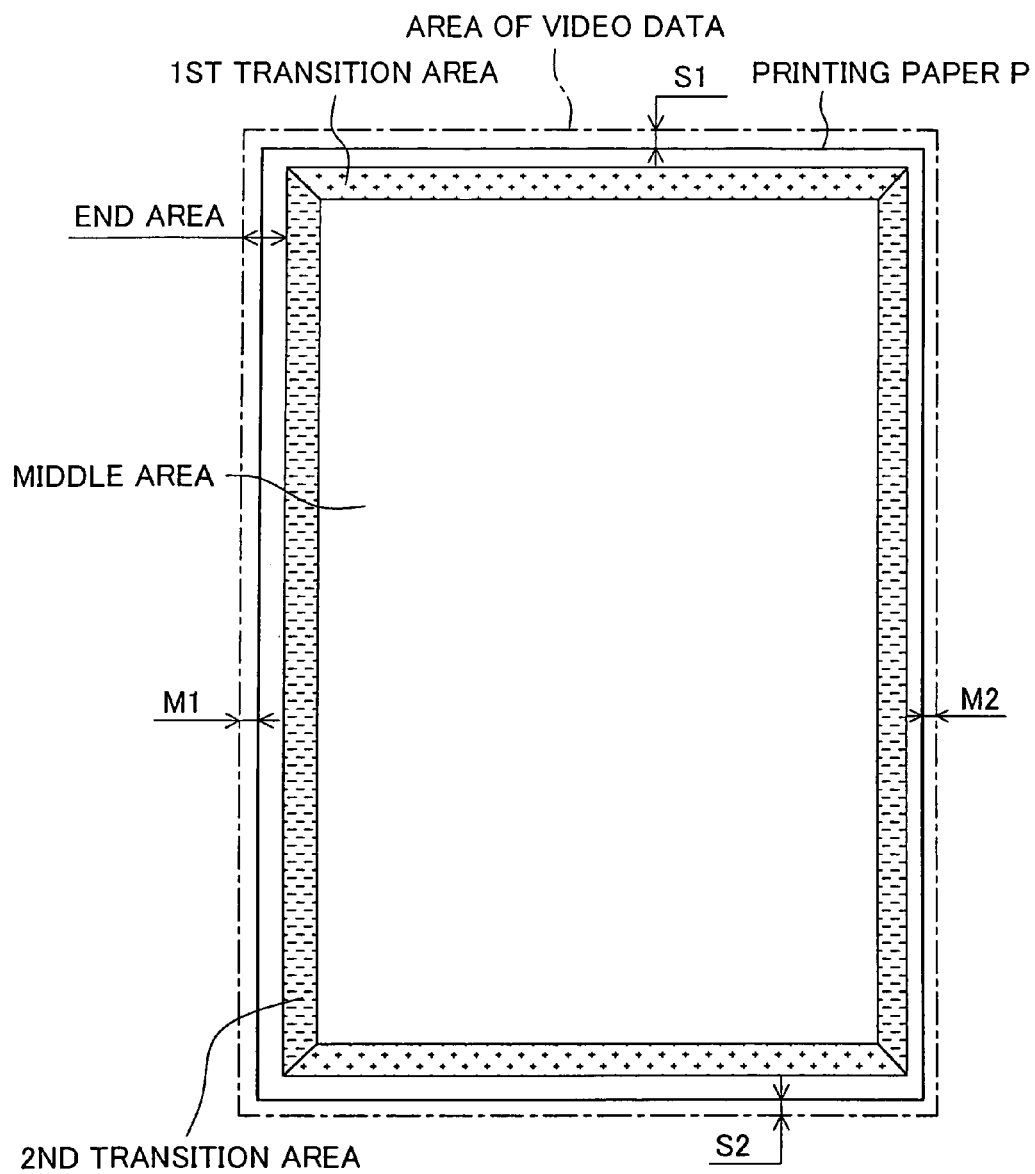
FIG. 29 is a plan view showing an area of resolution-converted video data relative to the area of printing paper P in a seventh embodiment of the invention.

FIG. 29 is a plan view showing an area of resolution-converted video data relative to the area of printing paper P in a seventh embodiment of the invention. The area of video data shown in FIG. 29 has predetermined marginal widths relative to the area of the printing paper P, like the area shown in FIG. 19.

The marginal widths are set to enable ink droplets to be hit up to the respective ends of the printing paper P, regardless of the potential sub-scan feed error of the printing paper P and the potential hitting error of the ink droplets. Optimum marginal widths depend upon the size and the type of printing paper. The shift at the end of the printing paper P by the slope of the printing paper P varies according to the size of the printing paper P, whereas the sub-feed scan error varies according to the type of the printing paper P.

FIG. 30 is a table showing optimum marginal widths corresponding to respective sizes and types of printing paper, where the optimum marginal width represents a minimum possible marginal width that ensures printing to ends of printing paper. The smaller settings of marginal widths are desirable, since the large marginal widths cause the ends of the image area to be out of the area of the printing paper P. In the structure of this embodiment, the resolution conversion module 97 (FIG. 1) carries out resolution conversion according to the size and the type of printing paper, based on the settings of marginal widths shown in FIG. 30.

Marginal widths M1 and M2 in the main scanning direction and an upstream marginal width S1 in the sub-scanning direction are varied corresponding to the size of printing paper. A downstream marginal width S2 in the sub-scanning direction is varied corresponding to both the size and the type of printing paper, because of a variation in frictional force of the printing paper relative to the sub-scan feed mechanism.

The procedure of this embodiment specifies the settings of marginal widths corresponding to the size and the type of printing paper. This arrangement advantageously reduces the marginal widths, which may cause deviation of an image out of the area of printing paper, while ensuring printing to the ends of the printing paper.

I. Modifications

The embodiments discussed above and their modified examples are to be considered in all aspects as illustrative and not restrictive. There may be many other modifications, changes, and alterations without departing from the scope or spirit of the main characteristics of the present invention. Some examples of possible modification are given below.

I-1. Each of the above embodiments regards the printer that activates each nozzle to selectively form any of the three variable-size dots having different sizes in the area of one pixel on a printing medium. The printer may be capable of selectively creating two different types of dots or may be capable of selectively creating four or more different types of dots. The printer of the invention is required to activate each nozzle and selectively form any of N different types of dots (where N is an integer of not less than 2) having different sizes in the area of one pixel on a printing medium.

I-2. In the embodiments discussed above, the systematic dither method is applied to reduce the number of tone values. Another tone-decreasing technique, such as the error diffusion method or the density pattern method, may alternatively be applied to reduce the number of tone values. One pixel of video data may not be mapped to one pixel on a printing medium. Multiple pixels on a printing medium may correspond to one pixel of video data.

I-3. Each of the above embodiments regards the inkjet printer with piezoelectric elements. The technique of the invention is also applicable to diversity of printers including a printer that supplies electric power to heaters located in nozzles and ejects inks by means of bubbles produced therein, as well as to other printing devices.

I-4. The procedure of each embodiment discussed above increases the dot recording rate of another-size dot to compensate for a decrease in dot recording rate of the small-size dot. Such compensation is, however, not essential to attain the object of the invention that ensures printing to the respective ends of printing paper, while restraining adhesion of relatively small-size ink droplets onto a printing device. The small-size dots may simply be replaced by the medium-size dots. The compensation, however, advantageously restrains a potential decrease in tone fidelity.

I-5. In the embodiments discussed above, the small-size dot alone is set to the specific dot. Both the small-size dot and the medium-size dot may alternatively be set to the specific dots. In this modified arrangement, the dot recording rate is preferably set to replace these specific dots with the large-size dot in the end area and in the transition area. In general, the preferable procedure of the invention replaces at least one relatively small-size dot among multiple different types of dots having different sizes by another-size dot.

In the embodiments discussed above, the small-size ink droplet IPs is joined with the subsequently-ejected medium-size ink droplet IPm to the large-size ink droplet IPL for formation of a large-size dot. In the structure of combining the small-size ink droplet IPs with the medium-size ink droplet IPm not in the middle of ejection but on a printing medium, the large-size dot is also set to the specific dot. In this case, there is a possibility that the small-size ink droplet IPs is floated in the course of formation of a large-size dot.

I-6. In the embodiments discussed above, the tone-decreasing is carried out by every raster line. The tone-decreasing may alternatively be carried out by every two raster lines. The terminology 'sequentially in the main scanning direction' in the claims of the invention includes the case of processing pixels belonging to multiple raster lines in the main scanning direction. Here the first transition area represents an area that is extended in the direction parallel to the main scanning direction and consists of a set of multiple raster lines (main scanning lines), which are subjected to tone-decreasing with an identical dot recording rate table.

The division of the transition area is not restricted to any of the divisions shown in the above embodiments (see FIGS. 9 and 19). There are other possible divisions, for example, a division shown in a modified example (FIG. 31). In this modified example, corners of the transition area are included in second transition areas, instead of first transition areas. Here the first transition area represents an area that is extended in the direction parallel to the main scanning direction and consists of a set of at least part of multiple raster lines (main scanning lines), which are subjected to tone-decreasing with an identical dot recording rate table.

I-7. Each of the above embodiments uses only color inks containing coloring matters. The invention is also applicable to a printing technique that ejects quality-enhancing ink for improvement of the quality of resulting prints to formedots on a printing medium.

In this modified structure, the tone-decreasing module 99 generates dot data representing the dot formation of a transparent dot with the quality-enhancing ink in respective pixels according to the pixel values of given video data with regard to the respective pixels. The dot data are generated according to multiple transparent dot recording rate tables stored in the dot recording rate table storage module. Here the transparent dot recording rate table stores settings of a transparent dot recording rate or a dot recording rate of the transparent dot.

In one preferable structure, the table selection module changes over selection of one among the multiple transparent dot recording rate tables, only in response to a changeover of a selected dot recording rate table to be applied to tone-decreasing of dots formed with an ink other than the quality-enhancing ink among inks available in the printing module. This arrangement determines the dot recording rate of the transparent dot with the quality-enhancing ink, without excessively complicating the processing. For example, selection of the transparent dot recording rate table is changed over, simultaneously with a changeover of the dot recording rate table for another color ink in the first transition area. This desirably restricts an increase in frequency of the changeover of the dot recording rate table.

I-8. The procedure of the above embodiment reduces the total ejection quantity of color inks, cyan, magenta, and yellow, in the end area, and increases the ejection quantity of black ink to compensate for a resulting color change. In a printing device that is capable of ejecting both dark inks having relatively high densities, for example, dark cyan, magenta, and black inks, and light inks having relatively low densities, for example, light cyan, magenta, and black inks, the procedure may reduce the ejection quantities of the light inks and increase the ejection quantities of the darks inks to compensate for a resulting color change. The increased ejection quantities of the dark inks are naturally less than the decreased ejection quantities of the light inks. This advantageously reduces the total quantity of ink ejection.

In the structure that is capable of additionally ejecting red ink to express a color approximate to the color expressed by a combination of magenta ink and yellow ink, the procedure may reduce the ejection quantities of magenta ink and yellow ink and increase the ejection quantity of red ink to compensate for a resulting color change.

I-9. In the embodiment discussed above, the marginal widths are set according to the size and the type of a printing medium. In one possible modification, the print control device has a user interface module that allows for a user's entry of information used to set at least one of the end area, the middle area, and the transition area, and determines the end area, the middle area, and the transition area, based on the user's entry. This arrangement enables the settings of marginal widths to be closer to the optimum values, when the user can estimate a potential deviation, for example, in the case where printing papers of one identical lot have similar deviation characteristics.

I-10. The technique of the invention is not restricted to color printing but is also applicable to monochromatic printing. The invention is also applied to a printing technique that is capable of creating multiple dots in the area of one pixel to express multiple tones.

I-11. In any of the above embodiments, part of the hardware configuration may be replaced by the software configuration, while part of the software configuration may be replaced by the hardware configuration. For example, part or all of the functions of the printer driver 96 shown in FIG. 1 may be executed by the control circuit 40 in the printer 20. In this modified structure, the control circuit 40 of the printer 20 exerts part or all of the functions of the computer 90 as the print control device that generates print data.

When part or all of the functions of the invention are attained by the software configuration, the software (computer programs) may be stored in computer-readable recording media. The 'computer-readable recording media' of the invention include portable recording media like flexible disks and CD-ROMs, as well as internal storage devices of the computer, such as various RAMs and ROMs, and external storage devices fixed to the computer, such as hard disks.

The Patent applications given below as the bases of the priority claim of the present application are included in the disclosure hereof by reference:

(1) Patent Application No. 2003-191142 (filed on Jul. 3, 2003)
(2) Patent Application No. 2003-312098 (filed on Sep. 4, 2003)
(3) Patent Application No. 2003-343232 (filed on Oct. 1, 2003)

What is claimed is:

1. A print control method of generating print data to be supplied to a print unit to print, the print unit forming dots by ejecting an ink on a printing medium, the print control method comprising:
a dot data generation step of generating dot data representing a state of dot formation at each pixel according to a pixel value of given image data,
wherein the dot data generation step includes the step of generating the dot data, such that the state of dot formation with respect to at least part of the pixel values in a pixel belonging to an end area located on an end of the printing medium is different from the state of dot formation in a pixel belonging to a middle area located in a middle of the printing medium, so as to reduce adhesion of the ink to the print unit, and wherein the printing unit comprises a print head having a plurality of nozzles and a plurality of ejection drive elements for ejecting an ink from the plurality of nozzles, and is capable of selectively forming one of N types of dots having different sizes at one pixel area with each nozzle, the N being an integer of at least 2, and the dot data generation step includes the step of making a value of the specific dot recording rate with respect to at least part of the pixel values in the pixel belonging to the end area lower than a value of the specific dot recording rate in the pixel belonging to the middle area, the specific dot being at least one relatively small-size dot among the N types of dots.

2. The print control method in accordance with claim 1, wherein the dot data generation step includes the step of varying a dot recording rate of a greater size dot having a larger size than a size of the specific dot, in order to compensate for a difference between the value of the specific dot recording rate in the pixel belonging to the end area and the value of the specific dot recording rate in the pixel belonging to the middle area with respect to an identical pixel value.

3. The print control method in accordance with claim 1, wherein the printing medium is roll paper, and the end area is set only on an end parallel to a sub-scanning direction of the roll paper.

4. The print control method in accordance with claim 1, further comprising:

a step of providing an end-area dot recording rate table to be applied to the pixel belonging to the end area and a middle-area dot recording rate table to be applied to the pixel belonging to the middle area, wherein the dot data generation step includes the step of selecting the end-area dot recording rate table for the pixel belonging to the end area, while selecting the middle-area dot recording rate table for the pixel belonging to the middle area.

5. The print control method in accordance with claim 4, wherein the dot data generation step includes the step of determining a value of the specific dot recording rate in a transition area located between the end area and the middle area, by an interpolation with the end-area dot recording rate table and the middle-area dot recording rate table.

6. The print control method in accordance with claim 4, further comprising:

a step of providing a transition-area dot recording rate table to be applied to a pixel belonging to the transition area located between the end area and the middle area, wherein the dot data generation step includes the step of selecting the transition-area dot recording rate table for the pixel belonging to the transition area, and the transition-area dot recording rate table is configured to have a value of the specific dot recording rate higher than a value of the specific dot recording rate in the end-area dot recording rate table and lower than a value of the specific dot recording rate in the middle-area dot recording rate table, with respect to at least part of the pixel values.

7. The print control method in accordance with claim 6, wherein the transition-area dot recording rate table includes a plurality of dot recording rate tables having mutually different specific dot recording rates with respect to at least part of the pixel values, the plurality of dot recording rate tables having a value of the specific dot recording rates higher than a value of the specific dot recording rate in the end-area dot recording rate table and lower than a value of the specific dot recording rate in the middle-area dot recording rate table, and the dot data generation step includes the step of selecting one among the plurality of dot recording rate tables included in the transition-area dot recording rate table, based on a position of each pixel in the transition area, such that the closer the position of the pixel is located to the middle area, the higher a dot recording rate table having a value of the specific dot recording rate with respect to at least part of the pixel values is selected.

8. The print control method in accordance with claim 6, wherein the dot data generation step includes a specific step of generating the dot data with respect to each main scanning line as a set of pixels adjoining to one another in a main scanning direction, and the specific step comprises the step of determining a value of the specific dot recording rate in the transition area, by an interpolation with the end-area dot recording rate table and the middle-area dot recording rate table, when a plurality of dot recording rate tables are required for generation of the dot data with regard to one main scanning line.

9. The print control method in accordance with claim 6, wherein the dot data generation step includes a specific step of generating the dot data with respect to each sub-scanning line as a set of pixels adjoining to one another in a sub-scanning direction, and the specific step comprises the step of determining a value of the specific dot recording rate in the transition area, by an interpolation with the end-area dot recording rate table and the middle-area dot recording rate table, when a plurality of dot recording rate tables are required for generation of the dot data with regard to one sub-scanning line.

10. The print control method in accordance with claim 1, wherein the print unit is capable of ejecting a plurality of different inks on the printing medium, the print control method further comprising:

a step of providing a middle-area color conversion table to be applied to the pixel belonging to the middle area and an end-area color conversion table to be applied to the pixel belonging to the end area, the end-area color conversion table being configured to make a value of a total ink ejection quantity of the plurality of different inks smaller than a value of the total ink ejection quantity due to the middle-area color conversion table, with respect to at least part of the pixel values, wherein the dot data generation step includes a color conversion step of selecting the end-area color conversion table for the pixel belonging to the end area while selecting the middle-area color conversion table for the pixel belonging to the middle area, and converting color with the selected color conversion table with regard to each pixel belonging to either of the end area and the middle area, and also converting color with the end-area color conversion table and the middle-area color conversion table with regard to each pixel belonging to a transition area located between the end area and the middle area to surround the middle area, and the color conversion step comprising the step of converting color with regard to the pixel belonging to the transition area, so as to make a value of the total ink ejection quantity with respect to at least part of the pixel values in the pixel belonging to the transition area greater than a value of the total ink ejection quantity in the pixel belonging to the end area and smaller than a value of the total ink ejection quantity in the pixel belonging to the middle area.

11. The print control method in accordance with claim 10, wherein the plurality of different inks include cyan ink, magenta ink, yellow ink, and black ink, and the end-area color conversion table is configured to have a smaller value of an ejection quantity sum of the cyan ink, the magenta ink, and the yellow ink than a value of the ejection quantity sum in the middle-area color conversion table, and to increase an ejection quantity of the black ink in order to compensate for a color change due to a decrease in the ejection quantity sum.

12. The print control method in accordance with claim 10, wherein the print unit is capable of ejecting a dark ink having a relatively high density and a light ink having a relatively low density, and the end-area color conversion table is configured to have a smaller value of an ejection quantity of the light ink than a value of the ejection quantity of the light ink in the middle-area color conversion table, and to increase an ejection quantity of the dark ink in order to compensate for a color change due to a decrease in the ejection quantity of the light ink.

13. The print control method in accordance with claim 10, wherein the color conversion step comprises the step of converting color with regard to the pixel belonging to the transition area, by an interpolation with the end-area color conversion table and the middle-area color conversion table.

14. The print control method in accordance with claim 10, wherein the transition area is divided into a first transition area and a second transition area, the first transition area being extended in a direction parallel to a main scanning direction, the second transition area being other than the first transition area, the print control method further comprising:

a step of providing a first transition-area color conversion table that is configured to have a greater value of a total ejection quantity of the plurality of different inks with regard to at least part of the pixel values than a value of the total ejection quantity in the end-area color conversion table and have a smaller value than a value of the total ejection quantity in the middle-area color conversion table, the total ejection quantity, the dot data generation step sequentially generating the dot data in the main scanning direction, the color conversion step includes the step of generating the dot data by application of the first transition-area color conversion table to a pixel belonging to the first transition area and by an interpolation with the end-area color conversion table and the middle-area color conversion table with regard to a pixel belonging to the second transition area.

15. The print control method in accordance with claim 10, the print control method further comprising:

a step of determining the end area, the middle area, and the transition area according to a printing environment, the printing environment including at least one of a type and a size of the printing medium.

16. The print control method in accordance with claim 10, the print control method further comprising:

a step of allowing for a user's entry used to set at least one of the end area, the middle area, and the transition area; and a step of determining the end area, the middle area, and the transition area, based on the user's entry.

17. The print control method in accordance with claim 1, the print control method further comprising:

a step of providing an end-area dot recording rate table to be applied to the pixel belonging to the end area located on the end of the printing medium, a middle-area dot recording rate table to be applied to the pixel belonging to the middle area located in the middle of the printing medium, and a first transition-area dot recording rate table to be applied to a pixel belonging to a first transition area that is extended in a direction parallel to a main scanning direction, the dot data generation step comprising:

a first dot recording rate determination step of selecting the end-area dot recording rate table for the pixel belonging to the end area, selecting the middle-area dot recording rate table for the pixel belonging to the middle area, and selecting the first transition-area dot recording rate table for the pixel belonging to the first transition area, and also determining dot recording rates of the N different types of dots with the selected dot recording rate table with regard to each pixel belonging to one of the end area, the middle area, and the first transition area; and a second dot recording rate determination step of determining dot recording rates of the N different types of dots in a second transition area, by an interpolation with the end-area dot recording rate table and the middle-area dot recording rate table, the second transition area being a residual transition area other than the first transition area, wherein the end-area dot recording rate table is configured to have a lower value a specific dot recording rate with respect to at least part of the pixel values than a value of the specific dot recording rate in the middle-area dot recording rate table, the specific dot being at least one relatively small-size dot among the N types of dots.

the first transition-area dot recording rate table is configured to have a higher value of the specific dot recording rate with respect to at least part of the pixel values than a value of the specific dot recording rate in the end-area dot recording rate table and have a lower value of the specific dot recording rate than a value of the specific dot recording rate in the middle-area dot recording rate table.

18. The print control method in accordance with claim 17, wherein the second dot recording rate determination step comprises the step of an interpolation to determine the dot recording rates of the N different types of dots in the second transition area.

19. The print control method in accordance with claim 17, wherein
the print unit is capable of further forming dots by ejecting a quality-enhancing ink on the printing medium, the quality-enhancing ink being for improving quality of a printed material,
the print control method further comprising a step of providing a plurality of transparent dot recording rate tables storing a plurality of dot recording rates of the transparent dot, wherein
the second dot recording rate determination step comprises the step of generating dot data representing a formation of the transparent dot formed with the quality-enhancing ink at the each pixel, according to the pixel values of the given image data with regard to the respective pixels, and configured to change over the plurality of transparent dot recording rate tables, only when changing over of a selected dot recording rate table to be applied to an ink other than the quality-enhancing ink among inks available in the print unit.

20. A print method of printing by ejecting an ink on a printing medium, comprising:
a dot data generation step of generating dot data representing a state of dot formation at each pixel according to a pixel value of given image data; and
a step of forming dots by ejecting the ink on the printing medium according to the generated dot data;
wherein the dot data generation step includes the step of generating the dot data, such that the state of dot formation with respect to at least part of the pixel values in a pixel belonging to an end area located on an end of the printing medium is different from the state of dot formation in a pixel belonging to a middle area located in a middle of the printing medium, so as to reduce adhesion of the ink to the print unit, and wherein
the step of forming dots comprises the step of providing a print head having a plurality of nozzles and a plurality of ejection drive elements for ejecting an ink from the plurality of nozzles, and is capable of selectively forming one of N types of dots having different sizes at one pixel area with each nozzle, the N being an integer of at least 2, and
the dot data generation step includes the step of making a value of a specific dot recording rate with respect to at least part of the pixel values in the pixel belonging to the end area lower than a value of the specific dot recording rate in the pixel belonging to the middle area, the specific dot being at least one relatively small-size dot among the N types of dots.

21. A printing apparatus for printing by ejecting an ink on a printing medium, comprising:
a print unit configured to form dots by ejecting an ink on a printing medium;
a print data generator configured to generate dot data representing a state of dot formation at each pixel according to a pixel value of given image data, and generate print data to be supplied to the print unit according to the dot data,
wherein the print data generator is configured to generate the dot data, such that the state of dot formation with respect to at least part of the pixel values in a pixel belonging to an end area located on an end of the printing medium is different from the state of dot formation in a pixel belonging to a middle area located in a middle of the printing medium, so as to reduce adhesion of the ink to the print unit, and wherein
the printing unit comprises a print head having a plurality of nozzles and a plurality of ejection drive elements for ejecting an ink from the plurality of nozzles, and is capable of selectively forming one of N types of dots having different sizes at one pixel area with each nozzle, the N being an integer of at least 2, and
the dot data generator is configured to make a value of a specific dot recording rate with respect to at least part of the pixel values in the pixel belonging to the end area lower than a value of the specific dot recording rate in the pixel belonging to the middle area, the specific dot being at least one relatively small-size dot among the N types of dots.

22. A computer program product for causing a computer to generate print data to be supplied to a print unit to print, the print unit forming dots on a print medium by ejecting an ink, the computer program product comprising:
a computer readable medium; and
a computer program stored on the computer readable medium, the computer program comprising:
a program for causing the computer to generate dot data representing a state of dot formation at each pixel according to a pixel value of given image data,
wherein the program is configured to generate the dot data, such that the state of dot formation with respect to at least part of the pixel values in a pixel belonging to an end area located on an end of the printing medium is different from the state of dot formation in a pixel belonging to a middle area located in a middle of the printing medium, so as to reduce adhesion of the ink to the print unit, and wherein
the printing unit comprises a print head having a plurality of nozzles and a plurality of ejection drive elements for ejecting an ink from the plurality of nozzles, and is capable of selectively forming one of N types of dots having different sizes at one pixel area with each nozzle, the N being an integer of at least 2, and
the program is configured to make a value of a specific dot recording rate with respect to at least part of the pixel values in the pixel belonging to the end area lower than a value of the specific dot recording rate in the pixel belonging to the middle area, the specific dot being at least one relatively small-size dot among the N types of dots.

* * * * *